US006289723B1

(12) United States Patent
Leon

(10) Patent No.: US 6,289,723 B1
(45) Date of Patent: Sep. 18, 2001

(54) DETECTING SEAL LEAKS IN INSTALLED VALVES

(76) Inventor: Robert L. Leon, 1401 Comly Ct., Maple Glen, PA (US) 19002

( * ) Notice: Subject to any disclaimer, the term of this patent is extended or adjusted under 35 U.S.C. 154(b) by 0 days.

(21) Appl. No.: 09/515,282

(22) Filed: Feb. 29, 2000

Related U.S. Application Data

(60) Provisional application No. 60/122,818, filed on Mar. 4, 1999.

(51) Int. Cl.⁷ .............................. G01M 3/04; G01M 3/08; G01M 3/00
(52) U.S. Cl. ........................ 73/49.8; 73/592; 73/40.5 A
(58) Field of Search ............................ 73/49.8, 40.5 A, 73/46, 592, 602, 587

(56) References Cited

U.S. PATENT DOCUMENTS

| 3,592,967 | * | 7/1971 | Harris ........................... 367/180 |
| 3,814,207 | * | 6/1974 | Kusuda et al. .................. 73/40.5 A |
| 3,930,556 | * | 1/1976 | Kusuda et al. .................. 73/40.5 A |
| 4,066,095 | * | 1/1978 | Massa ............................. 137/486 |
| 4,596,133 | * | 6/1986 | Smalling et al. ................ 73/24.01 |
| 4,858,462 | * | 8/1989 | Coulter et al. .................. 73/40.5 A |
| 5,038,614 | * | 8/1991 | Bseisu et al. ................... 73/592 |
| 5,531,111 | * | 7/1996 | Okamoto et al. ................ 73/149 |
| 5,548,530 | * | 8/1996 | Baumoel ........................ 702/51 |
| 5,623,421 | * | 4/1997 | Savic ............................. 702/51 |
| 6,128,946 | * | 10/2000 | Leon et al. ..................... 73/46 |
| 6,134,949 | * | 10/2000 | Leon et al. ..................... 73/40.5 A |

* cited by examiner

Primary Examiner—Hezron Williams
Assistant Examiner—Jay L. Politzer
(74) Attorney, Agent, or Firm—Akin, Gump, Strauss, Hauer & Feld, L.L.P.

(57) ABSTRACT

An apparatus is disclosed for detecting a leak in a valve and the magnitude of the leak. The valve has an upstream seal, a downstream seal and an inner cavity isolated by the seals. The apparatus comprises a mechanism for generating random pressure pulses in the inner cavity, a first sensor for detecting the onset of each pressure pulse and generating a trigger signal, a second sensor for sensing pressure pulses within the inner cavity and generating a representative second signal for each sensed pressure pulse and a third sensor located either upstream of the upstream seal or downstream of the downstream seal. The third sensor senses pressure pulses and generates a representative third signal for each sensed pressure pulse. Analysis circuitry samples and synchronously averages the second and third signals to determine the existence and magnitude of a seal leak.

20 Claims, 16 Drawing Sheets

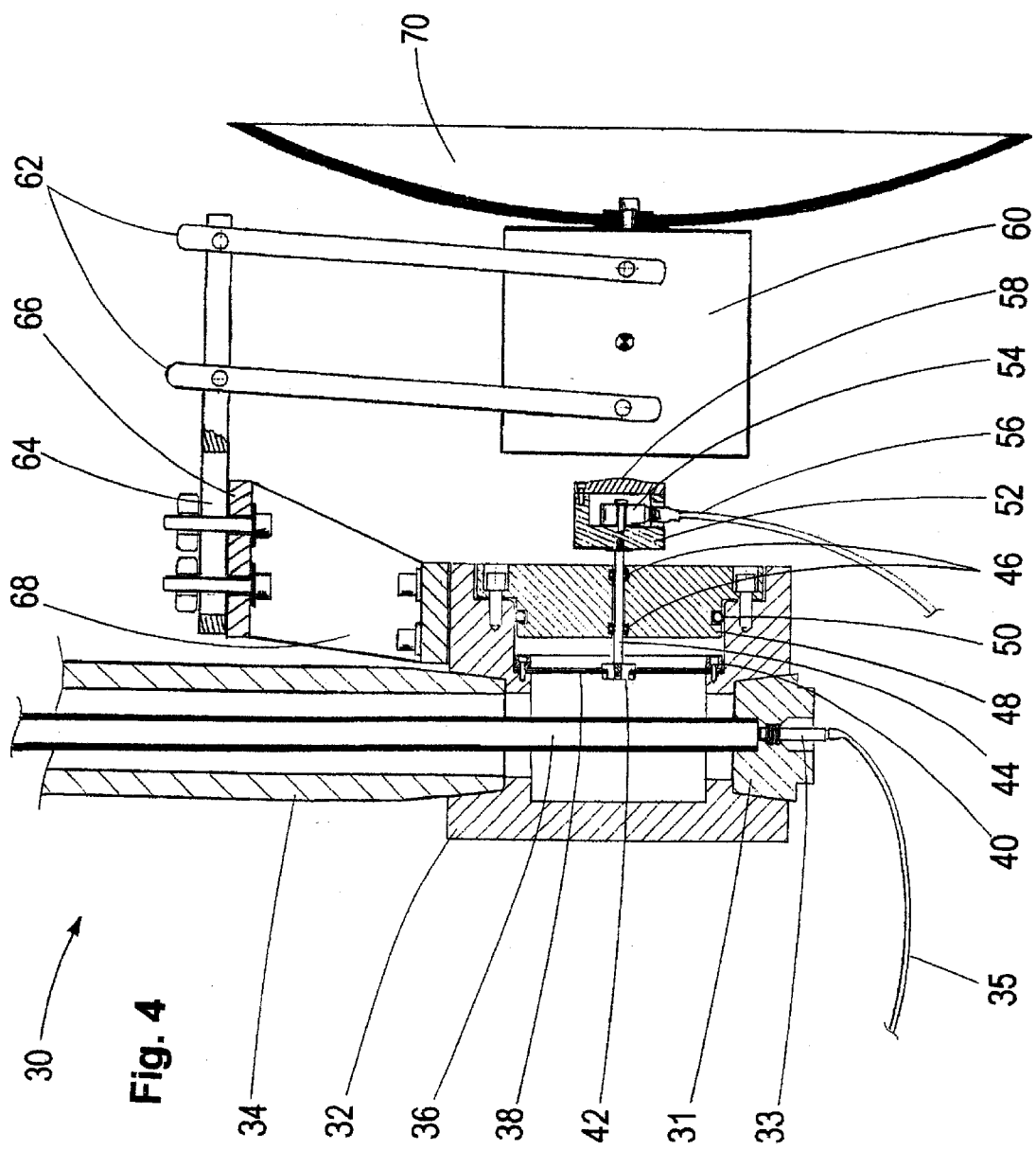

DETECTING SEAL LEAKS IN INSTALLED VALVES

CROSS-REFERENCE TO RELATED APPLICATIONS

This application claims the priority of U.S. Provisional Patent Application No. 60/122,818, filed Mar. 4, 1999, which is incorporated herein by reference.

BACKGROUND OF THE INVENTION

The present invention generally relates to the detection and quantitative evaluation of seal leaks in fluid transport systems, particularly Emergency Shut Down valves, more commonly known as ESD valves used in such systems. ESD valves are in use in many commercial and industrial facilities, and in particular, are used extensively on all, or virtually all, of the approximately 2,000 off-shore oil and gas platforms around the world, to isolate the platform in the event of an emergency. The purpose of the present invention is to provide a means for more easily and accurately determining, both on-line and during shutdown, if each of the ESD valves on the platform has sufficiently small seal leaks to properly perform it's intended isolation function. The need to verify the ability of safety devices and their key components, such as ESD valves and their seals, to properly perform their safety function on off-shore platforms, has been made more apparent by the Piper Alpha disaster in the British sector of the North Sea, which led to the sinking of that platform in the late 1980's, with an accompanying significant loss of life.

Off-shore platforms contain many different valves of various designs and purposes. Even the ESD valves themselves, which typically number more than ten on a platform, may be of various designs. Thus, to be practical and effective, any methodology for assessing the integrity of ESD valve seals must be able to address in large measure, all the various designs. ESD valves are normally open in use, and closed only during shutdowns, either a normal production shutdown or an emergency shutdown. The majority of the ESD valves are ball valves, with only a small minority being gate valves. The ESD valves are usually installed in-line or in series with other valves that may also be closed off in a shutdown situation. However, the ESD valve is considered to be the valve of last resort—the valve that must provide isolation should all the other in-line valves fail to fully close, or leak. On the platform, the other in-line valves may serve to limit the differential pressure across the ESD valve following a shutdown, the duration of that differential pressure, or both, thereby precluding the most commonly used method for detecting a leak in a closed valve—high frequency acoustic leak detection which essentially listens for the sound of the leaking fluid. However, even in the presence of high differential pressure, such a technique would not be capable of detecting a seal leak in a valve where only an upstream seal or only a downstream seal leaks, but not both because such a valve will not actually leak. Nevertheless, with one seal leak already, such a valve would be in danger of becoming a valve that would soon leak through, and so the detection of a single leaky seal is almost as important as a valve where both the upstream and downstream seals leak.

At present, in order to identify and quantify ESD valves with seal leaks, off-shore platform operators sometimes resort to pressurizing the inner cavity of the valve during a shutdown period to see how well the valve holds the pressure. This is not a desirable method, as it adds costly time to an already costly production shutdown. Furthermore, it is not possible to perform such a test during production. What is needed is a non-intrusive test. A test that will yield information about seal leaks, in production as well as in shutdown situations, and will do so for all commonly used types of ESD valves.

This inventor is aware of other patents and application, disclosed and pending, which purport to at least partially accomplish that goal, and these will be addressed in the present application. But none of these, including the inventor's own pending patent application, come close to achieving the capability of the present invention—particularly in the area of seal leak quantification.

This inventor's pending patent application (frequently referred to in the text that follows as the previous invention, or the previous patent application), was filed on Jun. 12, 1998, and is based on Provisional Patent Application No. 60/055,728 filed Jun. 26, 1997, and Provisional Patent Application No. 60/060,590 filed Oct. 1, 1997 now U.S. Pat. Nos. 6,134,949 and 6,128,946. It involves the combined frequency analysis of simultaneously obtained dynamic signals from one pressure transducer sensing the dynamic cavity pressure in the valve, and another pressure transducer sensing either the upstream or downstream dynamic pressure. Specifically, the frequency analysis called for is one of either: the Frequency Response Function (FRF) sometimes known as the Transfer Function; or the Coherence Function; or a combination of the two. The FRF measures the magnitude and phase relationship that exists (if any) between two signals as a function of frequency, and the Coherence Function measures the degree to which a consistent relationship exists (i.e., one that is repeatable), also as a function of frequency. The described method can be used during production for those type of ball valves that do not have a bleed hole in the ball to equalize the inner cavity pressure to the line pressure. Without an equalizing bleed hole, high Coherence (particularly at low frequencies) can be attributed to a leak in one of the seals. That is because only a seal leak would allow flow noise from the fluid in the pipe to enter the inner cavity, in the same way that a door to a room may be cracked open a bit to allow noise from the hallway to enter the room. The Coherence verifies that it's not just any noise that's entered the inner cavity, but the same noise that's in the pipe. When a pressure equalizing bleed hole exists in the ball, the method won't work because flow noise from the pipe gets into the inner cavity through the bleed hole, and causes high Coherence (nearly equal to 1.0), independent of whether or not a seal leak is present.

With no flow, such as when the valve is closed during a production shutdown, there is no flow noise in the pipe to make the above method of the previous invention work. For that reason, the aforementioned previous patent application also describes the use of an external sound source which injects either a single low-frequency sound, or highly repetitive clicks at some constant low frequency rate (the latter naturally including harmonics of that low frequency rate as well) into the inner cavity of the valve and checks for evidence of the sound upstream or downstream. The same frequency analyses (FRF or Coherence) are performed encompassing the frequency of the source (and if applicable, its harmonics) to determine whether a seal leak is present. As will be shown herein, the previous invention (although a step beyond prior methods) has many shortcomings.

The present invention eliminates many of the shortcomings of the previous invention, by recognizing that: 1) time, rather than frequency, is a more effective domain for analysis, especially when leak quantification is the goal; 2)

the combination of a unique time domain analysis method with the use of a random pulse generator enables production and shutdown situations to be treated alike, more simply, and more accurately; and 3) ball valves with bleed holes can be addressed in production situations using the procedures of the new invention.

The present invention will help off-shore oil and gas producers achieve two main goals: To improve safety on off-shore platforms by properly identifying ESD valves with unacceptable seal leaks. And to reduce costly unnecessary maintenance by properly identifying ESD valves with acceptable seal leaks.

BRIEF SUMMARY OF THE INVENTION

Briefly stated, the present invention comprises an apparatus for use with a fluid transport system, the system having an upstream pipe, a downstream pipe and a valve connected between the upstream pipe and the downstream pipe for controlling fluid flow through the system. The valve has at least one upstream seal and at least one downstream seal and an inner cavity effectively isolated by the seals from the fluid flow stream. The apparatus of the present invention is for detecting the presence of a leak in at least one of the seals and for determining the magnitude of a detected leak. The apparatus comprises a mechanism for generating pressure pulses which appear in the inner cavity of the valve. A first sensor is provided for detecting the onset of each pressure pulse, which exceeds a predetermined magnitude and for generating a trigger signal for each such detected pressure pulse. A second sensor is in fluid communication with the inner cavity for sensing pressure pulses within the inner cavity and for generating a representative second signal as a function of time for each such sensed pressure pulse. A third sensor is in fluid communication with the fluid flow stream and is located at one of (1) a predetermined distance upstream of the upstream seal and (2) a predetermined distance downstream of the downstream seal. The third sensor is for sensing pressure pulses and for generating a representative third signal as a function of time for each such sensed pressure pulse. Analysis circuitry is provided for receiving the trigger signals and the second and third signals and for sampling the second and third signals at predetermined times following the receipt of a trigger signal. The analysis circuit is also for synchronously averaging each of the sampled signals over multiple records to produce synchronously averaged waveforms and for using the two resulting synchronously averaged waveforms to determine the existence and magnitude of a seal leak in at least one of the seals.

In another embodiment, the present invention comprises an apparatus for use in such a fluid transform system for detecting the presence of a leak in at least one of the seals and for determining the magnitude of a detected leak. The apparatus comprises a mechanism for generating pressure pulses which appear in the inner cavity. A first sensor is provided for detecting the onset of each pressure pulse which exceeds a predetermined magnitude and for generating a trigger signal for each such detected pressure pulse. A second sensor is in fluid communication with the inner cavity for sensing pressure pulses within the cavity and for generating a representative second signal as a function of time for each such sensed pressure pulse. A third sensor is in fluid communication with the fluid flow stream at a predetermined distance upstream of the upstream seal for sensing pressure pulses and for generating a representative third signal as a function of time for each such sensed pressure pulse. A fourth sensor is in fluid communication with the flow stream a predetermined distance downstream of the downstream seal for sensing pressure pulses and for generating a representative fourth signal as a function of time for each such sensed pressure pulse. Analysis circuitry is provided for receiving the trigger signals and the second, third and fourth signals and for sampling the second, third and fourth signals at predetermined times following receipt of a trigger signal. The analysis circuitry is also for synchronously averaging each of the sampled signals over multiple records to produce synchronously averaged waveforms and for using the synchronously averaged waveforms to determine the existence and the magnitude of a seal leak in either of these seals.

In yet another embodiment, the present invention comprises a method for determining the presence and the magnitude of a leak in the fluid transport system having an upstream pipe, a downstream pipe and a valve connected between the upstream pipe and the downstream pipe for controlling fluid flow through the system. The valve has at least one upstream seal, at least one downstream seal and at least an inner cavity effectively isolated by the seals from the fluid flow stream. The method comprises generating pressure pulses which appear in the inner cavity; generating a trigger signal at the onset of each pressure pulse which exceeds a predetermined magnitude; sensing each pressure pulse within the inner cavity and generating a representative second signal as a function of time for each such sensed pressure pulse; sensing each pressure pulse within the fluid flow stream at a predetermined distance from the valve and generating a representative third signal as a function of time for each such sensed pressure pulse; sampling the second and third signals at predetermined times following a trigger signal; and synchronously averaging each of the sampled signals over multiple records and using the resulting synchronous averaged waveforms to determine the existence and magnitude of a seal leak in at least one of the seals.

BRIEF DESCRIPTION OF THE DRAWINGS

The foregoing summary, as well as the following detailed description of four preferred embodiments of the invention, will be better understood when read in conjunction with the appended drawings. For the purpose of illustrating the invention, particular arrangements and methodologies are shown in the drawings. It should be understood, however, that the invention is not limited to the precise arrangements shown, or the methodologies of the detailed description. In the drawings:

FIG. 4 is a cross sectional elevational view of a wind driven random pulse generator;

DETAILED DESCRIPTION OF THE INVENTION

Figure 1:
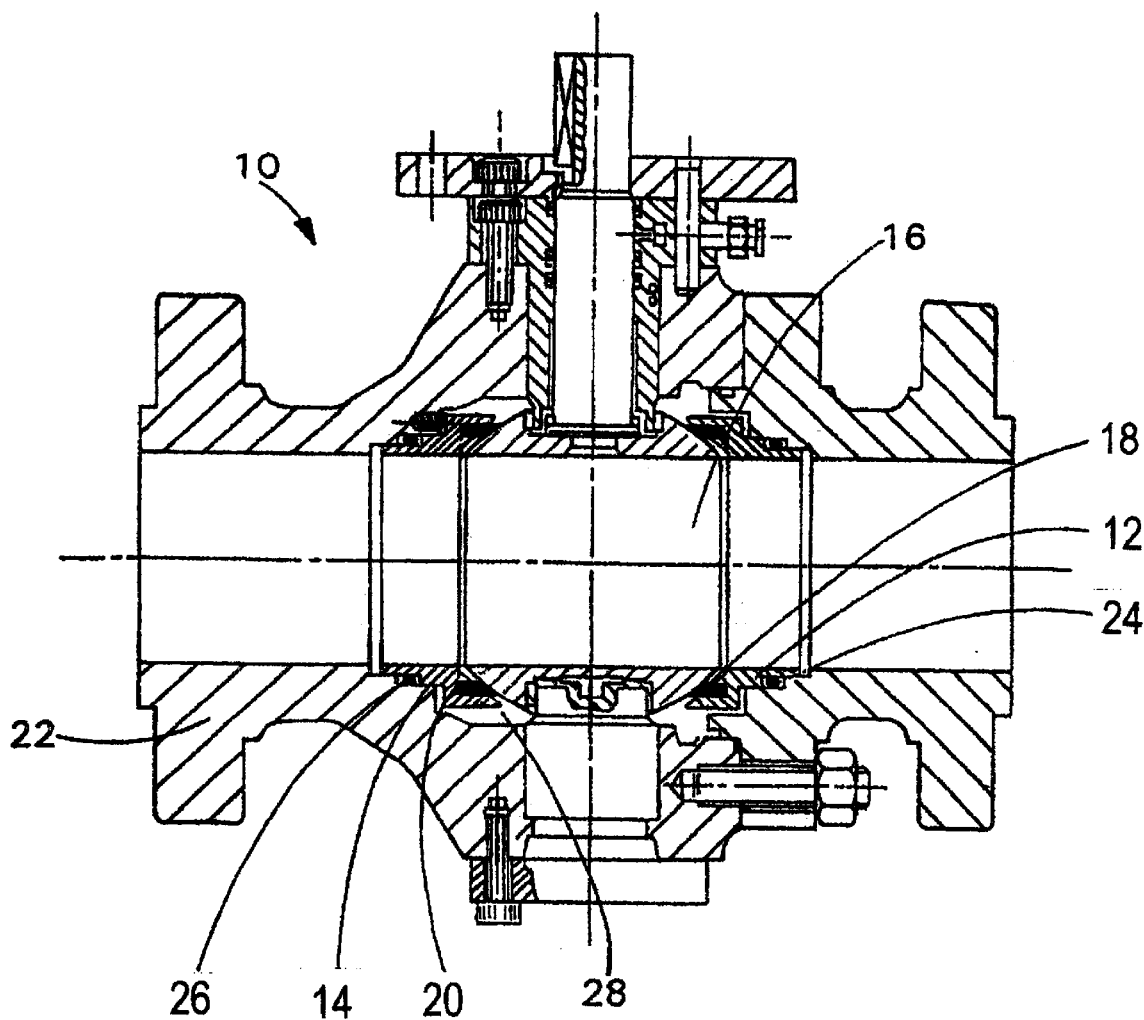
FIG. 1 is a cross sectional elevational view of a ball-type emergency shutdown valve (most common type of ESD valve on off-shore oil and gas platforms), shown in the open (production) position to enable fluid flow.

FIG. 1 is a cross sectional elevational view of valve 10, of the type most used in ESD applications, illustrated in the open position. Valve 10 is a ball valve having a spring-loading mechanism consisting of several small compression springs on each side that push the two valve seats 12, 14 up against the ball 16 in a manner well known in the art. Only one spring (not numbered) is shown here in the cross sectional view in the upper left. The sealing of the valve seats 12, 14 against the ball 16 is accomplished by means of two generally annular elastomeric rings, one ring 18 located in the upstream seat 12, and one ring 20 located in the downstream seat 14. The spring loading of the seats 12, 14 holds the elastomeric rings 18, 20 tightly against the ball 16, even as these components wear. Because the seats 12, 14 can move, they also have to be sealed against the valve body 22 and this is accomplished with two O-ring seals 24, 26, one for each seat 12, 14.

The generally open space 28 between the valve body 22, and the seats 12, 14 and the ball 16, is known as the inner valve cavity. The inner valve cavity or inner cavity 28 is generally fluid filled, but is effectively isolated from the fluid stream flowing through the valve 10 by the upstream elastomeric ring 18 and O-ring 24, and by the downstream elastomeric ring 20 and O-ring 26, each in parallel for the purpose of providing such isolation. Thus, if any one of the elastomeric rings 20, 22 or O-rings 24, 26 doesn't seal perfectly, the isolation of the cavity 28 is compromised. Also in the closed position of the valve 10 (not shown), the cavity remains isolated from the upstream fluid as long as both the upstream elastomeric ring 18 and the upstream O-ring 24 afford a perfect seal, and remains isolated from the downstream fluid as long as both the downstream elastomeric ring 20 and the downstream O-ring 26 afford a perfect seal.

For the valve 10 to actually leak when closed, at least one of the two upstream seals 18, 24 would have to leak and at least one of the two downstream seals 20, 26 would also have to leak to provide a complete leakage path through the cavity 28. Thus, a test that is sensitive to even one leaky seal would be a conservative, and therefore valuable test. Such is the case for the present practice of injecting pressurized nitrogen into the cavity 28. If any one of the seals 18, 20, 24, 26 leaks, the high pressure nitrogen will leak out of the cavity 28 and the pressure reduction of the nitrogen within the cavity 28 can be noted.

The method and apparatus of the present invention can also identify if any of the seals 18, 20, 24, 26 leaks, and gauge the magnitude of the leak, but can do so during production as well as during shutdown. Furthermore during shutdown, it can separately identify and gauge upstream leaks and downstream leaks, all without requiring the difficult nitrogen injection procedure that can extend a costly shutdown. Used as an on-line monitor, the existence and magnitude of any seal leak can be noted during production, and during shutdown the offending seal or seals (whether upstream or downstream) can be identified without any extension of the shutdown period. The on-line system automatically gathers and processes the data, and presents the results in a form from which the leak determination assessments can be made. This is similar to what's alleged in the previous patent application for the aforementioned previous invention, but as will be seen, the present invention accomplishes this differently and more effectively than is achievable with the previous invention.

Figure 2:
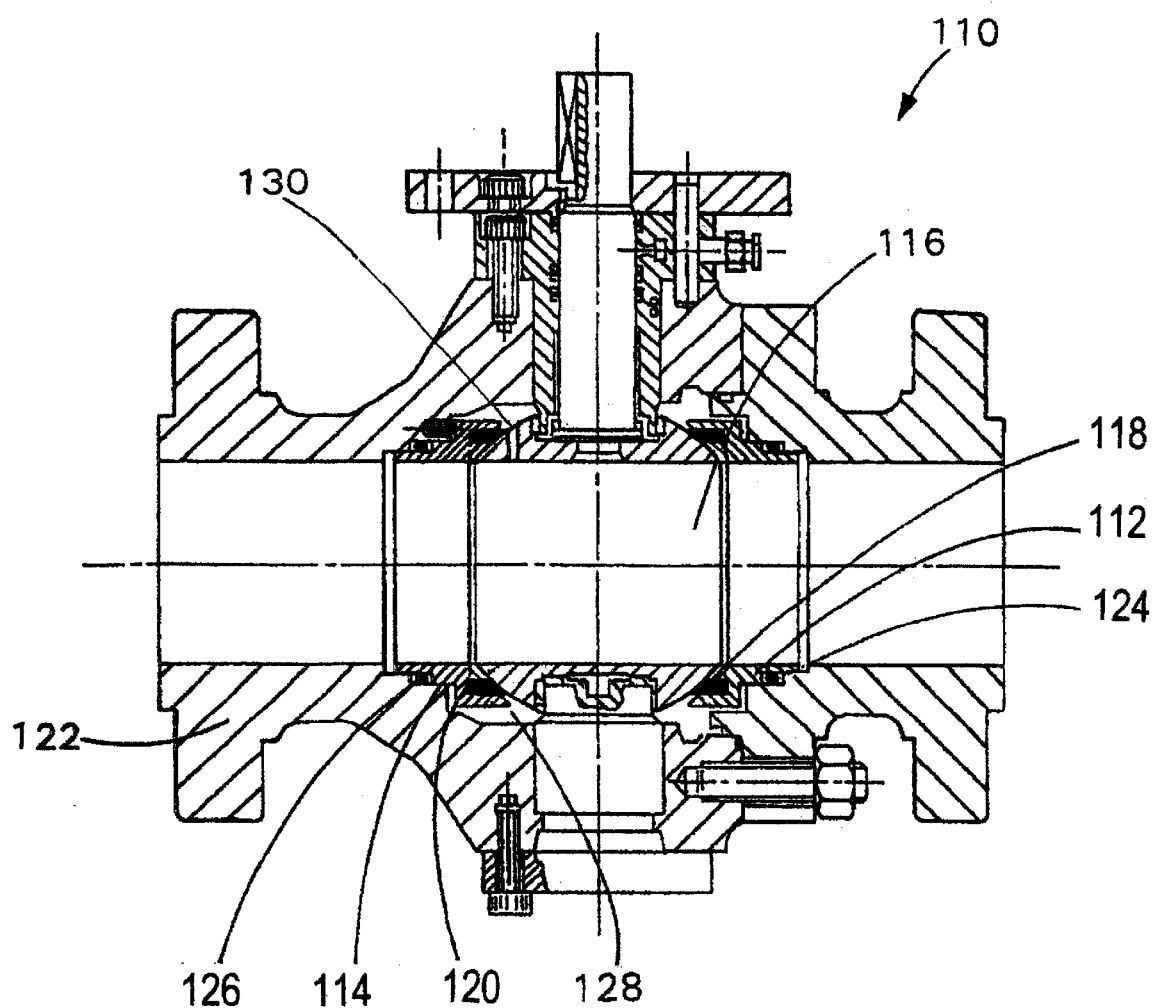
FIG. 2 is a cross sectional elevational view of a ball-type valve (less commonly used for ESD valve applications on off-shore oil and gas platforms), similar to the valve of FIG. 1, but modified to include a bleed hole in the ball to assure equalization of the inner cavity pressure to the line pressure in the illustrated open (production) position.

FIG. 2 is a cross sectional elevational view of a ball valve 110 similar to the ball valve 10 of FIG. 1. Note that the seats 112 and 114 are identical to seats 12 and 14 of the valve of FIG. 1, and similarly, the upstream elastomeric ring 118, the upstream O-ring 124, the downstream elastomeric ring 120, and the downstream O-ring 126 are identical to their counterparts, 18, 24, 20, and 26, respectively. Close examination, however, reveals a bleed hole 130 in the ball 116 which connects the fluid flow stream through the ball 116 to the cavity 128 while the valve 110 is in the open position as shown. The purpose of the bleed hole 130 is to equalize the pressure between the cavity 128 and the flow stream prior to valve closure. However, in the process of opening and closing, ball valves connect the inner cavity to the flow stream, and so the cavity becomes filled with the fluid in the pipe (either oil or gas), and becomes pressurized. For the vast majority of valves, even without a bleed hole, a tiny amount of seal leakage maintains the line pressure. At first glance, that last statement sounds like a contradiction to the whole purpose of the ESD valve, but as will be seen, in the final analysis it comes down to whether that amount of seal leakage is acceptable or unacceptable.

Ball valves 110 with bleed holes are not as commonly used for ESD applications as are ball valves 10 without bleed holes. Further, in a type of valve known as double block and bleed, if one seat seal leaks, the bleed hole provides additional closing force for the other seat seal. As stated in the aforementioned previous patent application submitted by this inventor (Leon et al), the bleed hole negates the use of that previous invention when a valve (like valve 110) is in the open (production) position. But the present invention enables such usage (described later) when the valve having a bleed hole goes into operation without a seal leak.

Figure 3:
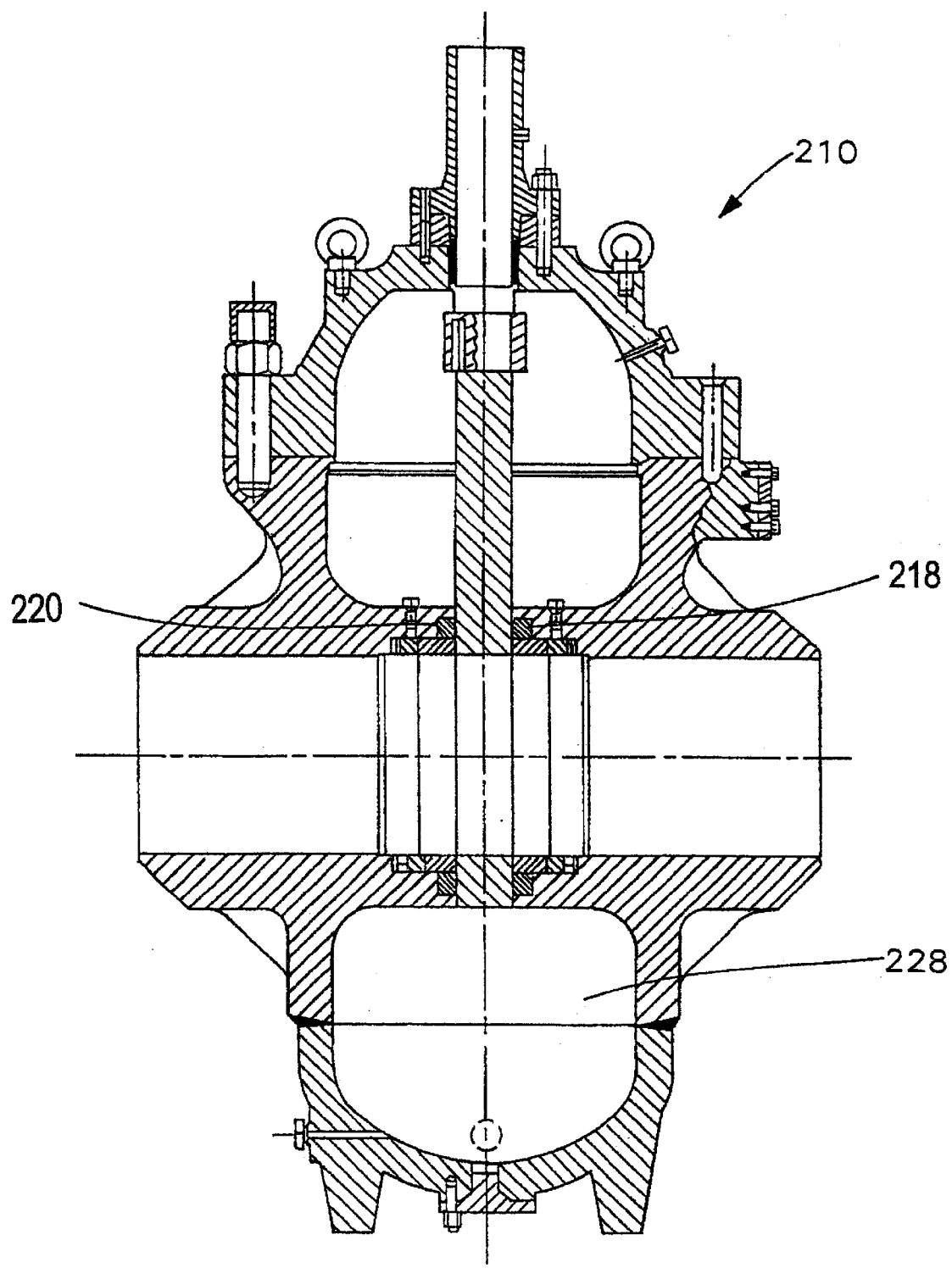
FIG. 3 is a cross sectional elevational view of a gate-type emergency shutdown valve (least commonly used for ESD valve applications on off-shore oil and gas platforms), shown in the open (production) position.

FIG. 3 is a cross sectional elevational view of a slide type gate valve 210, illustrated in the open position. While in the open position, the cavity 228 is completely isolated from the fluid flow stream by the upstream and downstream seals 218, 220. In the closed position (not shown), the upstream seal 218 isolates the cavity 228 from the fluid in the upstream pipe, and the downstream seal 220 isolates the cavity 228 from the fluid in the downstream pipe. Thus, for the purposes of this invention, this type of valve can be thought of as identical to ball valve 10 without a bleed hole, of the type illustrated in FIG. 1. Nevertheless, this type of valve is used sparingly in ESD applications.

In the present invention, sharp pressure pulses are injected into the inner cavity of the valve, and in the case of a seal leak, these pulses travel through the leaky seal and into the upstream and downstream pipes. The sharp pulses traveling upstream and downstream are captured before they can get adulterated by reflections and standing waves; they are cleansed of masking background noise; and finally they are measured and compared to the level they had on the cavity side of the seals to determine the size of the leak. In the following text and figures, the preferred apparatus and methodologies of the invention are put forth in great detail, and the overwhelming advantage of the present invention over previous inventions (in particular, this inventor's aforementioned previous invention) are made obvious through many comparisons.

A key element of the present invention is a random pulse generator, and one power source for such a generator, suitable for off-shore platforms, might be the wind. The feasibility of a wind driven pulse generator should be obvious to anyone who's ever been kept awake at night on a sailboat listening to the banging of the halyard against the mast. In essence, that's not too dissimilar from what's proposed here.

FIG. 4 illustrates a design for a wind driven random pulse generator 30. The main housing 32 of the wind driven random pulse generator attaches to a heavy-walled pipe extension 34, which connects by means of a union (not shown) to a similarly heavy-walled large-bore nipple (also not shown) which is contained in the lower portion of the inner cavity 28 of the valve, and is in communication with the fluid within the cavity. In the preferred configuration the nipple enters the bottom of the valve, but if room does not permit, it may enter at an angle and the pipe extension 34, if need be, can be bent to accommodate. The large bore of the pipe extension 34 (approximately 1½ inches) is continued through the top of the housing 32, through to the bottom. At the bottom, a larger diameter pipe thread accommodates a plug 31, which holds a pressure transducer 33, and a thin-walled internal tube 36 which extends up through the middle of pipe extension 34, and although the other end of the tube is not shown, it is long enough to reach an inch or so into the inner cavity 28. The function of tube 36 is to allow the pressure transducer 33 to measure the dynamic pressure not in the housing 32, but in the inner cavity 28. If the fluid is a gas, no problem is incurred in doing this. However, if the fluid is oil, it is necessary to insure that the total volume of any gas bubbles entrained in the tube is small enough as to cause no loss of fidelity in the signal. The alternative, which would inherently eliminate the fidelity problem, would be to locate (and seal) the pressure transducer 33 up at the top of tube 36, and use the tube to carry out the pressure transducer cable 35. The particular pressure transducer selected, and illustrated in FIG. 4, is PCB Model 113A20, which can withstand line pressures up to 3,000 psi, and has a self contained amplifier providing an amplified sensitivity of 20 millivolts per psi. However, other dynamic pressure transducers from other manufacturers, or with different characteristics, may be equally suitable.

Machined at right angles to the bore which contains the tube 36, is a 3 inch diameter blind cavity. Two inches above the bottom of the cavity, the size of the opening increases to a diameter of 3½ inches to form a flat shelf. The 3½ inch diameter continues upward another inch and a half, eventually to open up to 4½ inches.

Figure 4A:
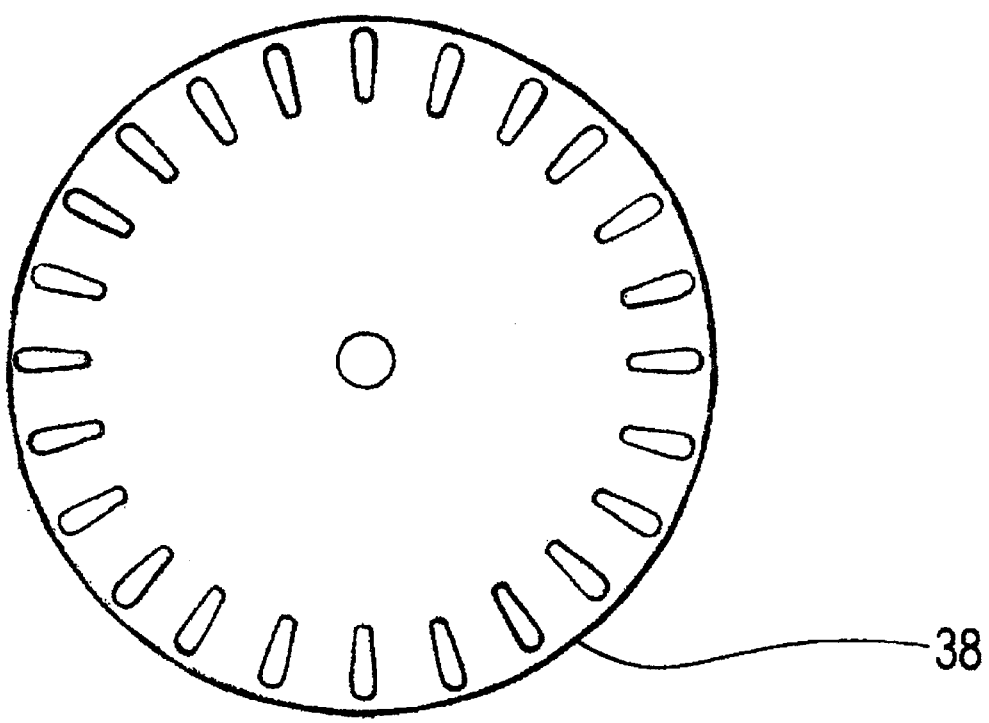
FIG. 4a is an elevational view of the diaphragm of the wind driven random pulse generator of FIG. 4.

The aforementioned shelf precisely accommodates a 3½ inch diaphragm 38, which is shown straight-on in more detail in FIG. 4a. The diaphragm 38 is made of high strength material (17-4 PH stainless steel, or hardened beryllium copper) and is about ⅟₁₆th of an inch thick. It is seen to have not only a through-hole at the center, but twenty-four openings spaced equally around its periphery. Because the openings extend inward of the 3 inch diameter blind cavity, the diaphragm 38 is incapable of sealing pressure, and indeed, one function of these openings is to provide a leakage path through the diaphragm in order to equalize the pressure across it. The outer portion of the peripheral openings is sized to accommodate the shank of a standard 4-40 screw, and twenty-four such screws are shown in FIG. 4, holding fast a clamping plate 40 tightly over the diaphragm 38 to hold the diaphragm immovably in place. The peripheral openings have still another function which will be explained later.

In FIG. 4, a hub assembly 42, consisting of a ½ diameter hub and hub nut, is seen mounted in the middle of diaphragm 38, the hub being precisely centered by the center hole in the diaphragm. The diaphragm's center hole and peripheral openings may be formed by a process known as photo-etching. The hub contains a 4-40 internal thread, into which is screwed one end of pusher rod 44. Pusher rod 44 is a polished, ⅛th inch diameter, stainless steel rod with a 4-40 screw thread on both ends. The rod 44 is supported by (in addition to the diaphragm hub), two O-rings 46, each having two backup rings for properly sealing the internal pressure under the reciprocating motion of the rod.

The O-rings 46 are contained within the sealing plate 48, a thick plate which also contains a static O-ring 50, which seals pressure along the 3½ diameter surface. The thick sealing plate 48 is held in place by twenty-four large high-strength screws, sufficient to hold back upwards of 20,000 pounds at 150 bar.

The other end of the pusher rod 44 threads into, and rigidly holds, the thick base of an accelerometer housing 52, leaving a significant clearance between the accelerometer housing 52 and the sealing plate 48. On the other side of the thick base is mounted an accelerometer 54, of a type which is well known in the art, and commonly used. The particular accelerometer selected, and shown in FIG. 4, is the Endevco Isotron Model 7250A-2, but many other makes, models, and types are suitable for the application. The walls of the accelerometer housing 52 are shown integrally machined with the base, with an opening purposely left on one side-wall to facilitate the exit of the accelerometer cable 56. At the top, a thick, crowned anvil 58 attaches to the side walls of the accelerometer housing, held in place by screws.

A moveable heavy ram 60 hangs not far from the anvil 58, poised to swing over and strike the anvil when blown by the wind. In the drawing, the ram 60 is shown hanging, not straight down, but in mid-excursion toward a collision with the anvil 58. The ram 60 is supported by four arms 62 which pivot at both the top and bottom on shoulder screws, allowing the ram 60 to remain level throughout its range of motion. The arms 62 are supported by an upper plate 64 which rests on a lower plate 66, which is held in place by a welded support assembly 68 which attaches to the top of the main housing 32. The lower plate 66 is shown with two screws located in fixed holes, while the upper plate 64 has a groove to accommodate the screws and allow for adjustability in the extension of the upper plate 64, thereby providing adjustability in the initial gap between the end surface of the ram 60 and the anvil 58. That adjustability changes slightly the point of contact on the ram 60, but the crowned surface of the anvil 58 insures that the impact always occurs at the center of the anvil.

At the other side of the ram 60, affixed by means of a simple screw and washer, is a wind-catcher dish 70. A rubber gasket is employed at the rear to better accommodate the round and flat surfaces. The ram 60 is assumed made of stainless steel, and furthermore is assumed to be a cube, about 4 inches on a side. That translates to a weight of approximately 18 pounds. The wind-catcher dish 70, as shown in the figure, is about 12 inches in diameter.

Depending upon prevailing wind conditions on the platform, larger or smaller wind-catcher dishes 70 can be employed. With diameters ranging from 16 inches to 5 inches, the resulting force for the same wind gust can span a 10 to 1 range. The weight of the ram 60 could be altered as well, but that variability is not required.

The length of the arms 62, as shown, are approximately 6 inches long, pivot to pivot. This is the only dimension that affects the pendulum natural frequency of the ram 60. At approximately 6 inches long, the pendulum natural frequency is about 1¼ Hertz, so it takes a little less than one second for the ram 60 to swing back and forth. Adjusting the initial gap between the ram 60 and the anvil 58 (measured when the ram is hanging straight down) has no affect on the pendulum natural frequency. The initial gap can be set anywhere from 0 to 1½ inches. If the center of mass of the ram is directly in line with the anvil at zero gap, it will be a negligible 0.060 inches high at contact when the initial gap is at the maximum setting of 1½ inches. Chances are, however, the initial gap will be set much smaller as will be discussed.

Figure 4B:
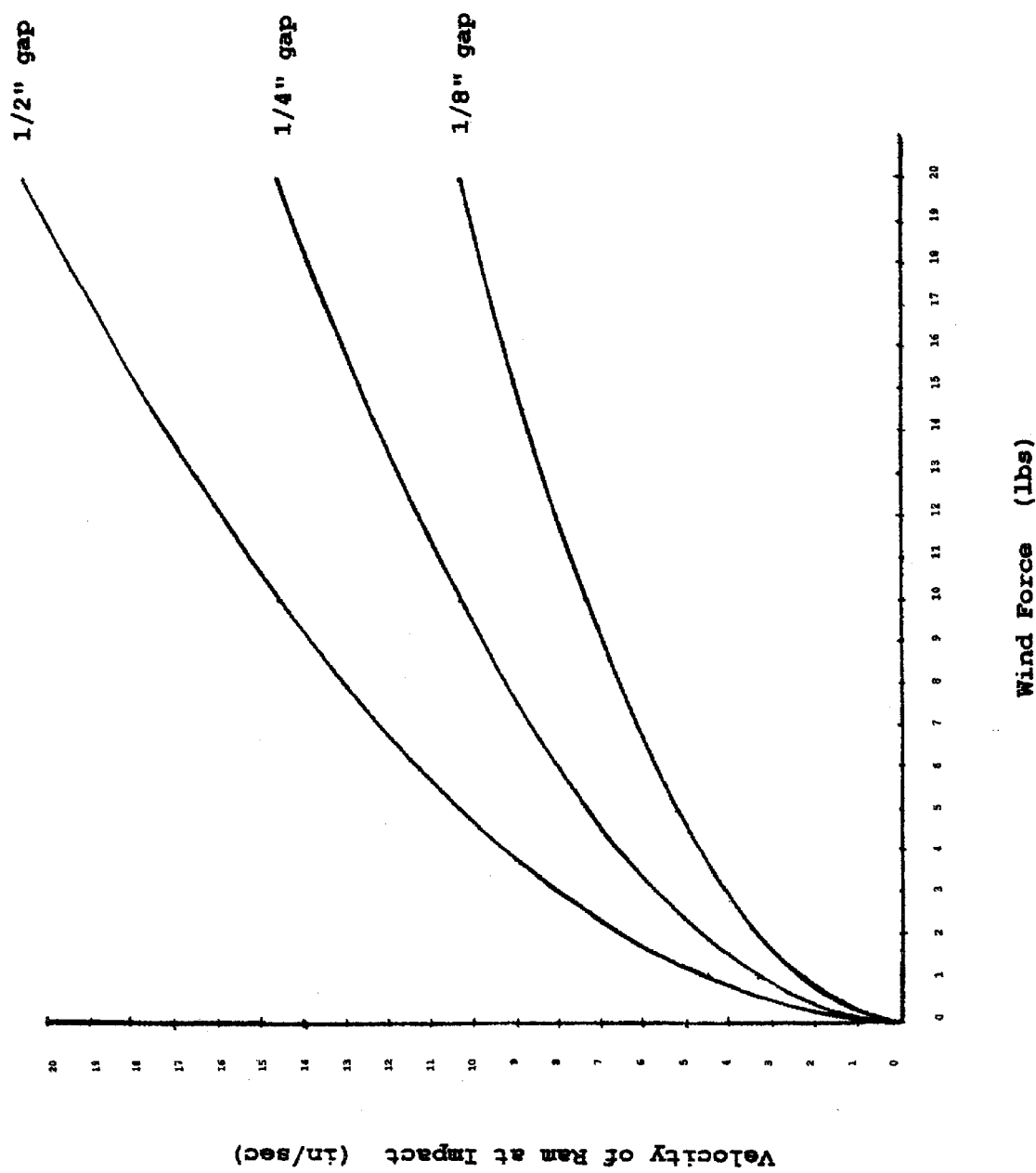
FIG. 4b is a graph showing the effect of "gap" on the relationship between the wind force and the velocity at impact.

FIG. 4b shows the velocity of the ram 60 at impact, as a function of wind force (the force on the wind-catcher dish), and initial gap. Based on the design of the diaphragm 38 and other items, the optimum average impact velocity is between 4 and 10 inches per second, with 2 inches per second being acceptable on the low end, and 20 inches per second acceptable on the high end. Using those criteria, a glance at the FIG. 4b shows gaps of ½, ¼, and ⅛th inches are all acceptable, with ½ inch being best for when calm conditions consistently exist. However, if high wind conditions sometimes arise, a ⅛th inch gap might be best, as a wind force as low as 1 pound would still produce an impact velocity greater than 2 inches per second, while at the same time it would take a wind force of over 75 pounds to produce an impact velocity greater than 20 inches per second.

Thus, a proper gap setting can result in usable impacts, almost regardless of wind conditions, and the approximately 1 Hertz pendulum frequency helps to assure a substantial number of usable impacts, estimated here to be at least five to twenty a minute. It should be noted, the wind need not be blowing from the direction of the ram 60 toward the anvil 58. Off-direction winds can be almost as effective. The wind can even be blowing in the opposite direction, with the ram swinging first away from the anvil (possibly to more than double the initial gap setting), then back into an impact.

Figure 4C:
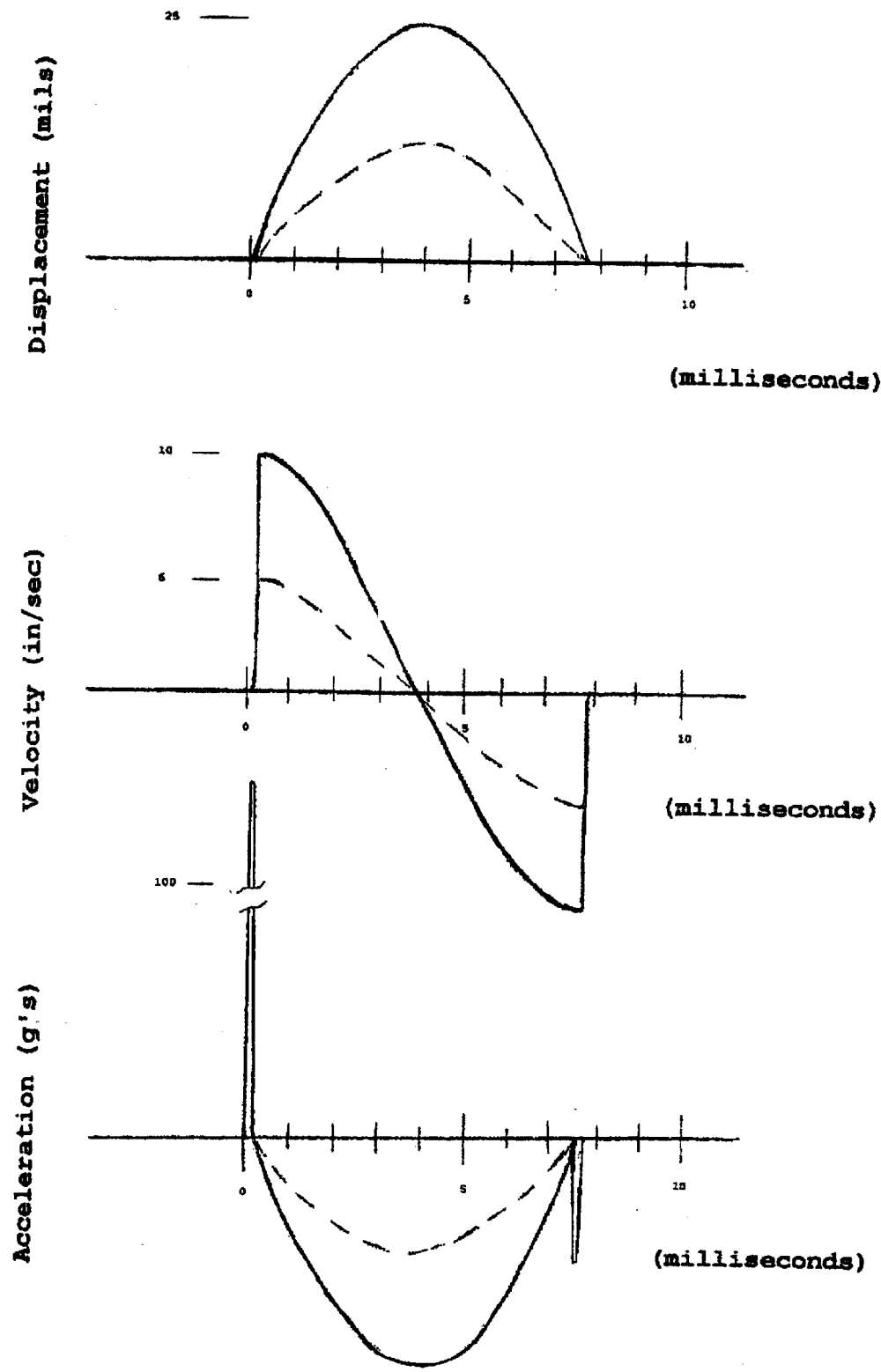
FIG. 4c shows the motion (the displacement, velocity, and acceleration) of the ram and all the items connected to the pusher rod of the wind driven pulse generator of FIG. 4 following an impact (in air)

At impact, the massiveness of the ram 60 assures its velocity is taken up by the accelerometer housing 52, the pusher rod 44, and the center of the diaphragm 38 in a very short amount of time (less than ⅒th of 1 millisecond). FIG. 4c illustrates the resulting displacement, velocity, and acceleration in air for a 10 inch-per-second impact velocity (solid) and 5 inch-per-second impact velocity (dotted) for the items mentioned above, which as indicated, almost immediately take on the motion of the ram 60. It's the "almost" in the "almost immediately" phrase, where the accelerometer comes into play. Naturally, nothing goes from zero velocity to a finite velocity in zero time—it must accelerate to that velocity. But under the assumption that this all takes place in 100 microseconds or less, the acceleration would be 100 peak g's or more for a 2 inch-per-second impact velocity, 500 peak g's or more for a 10 inch-per-second impact velocity, and 1,000 peak g's or more for a 20 inch-per-second impact velocity. This acceleration is the spike shown at the beginning of the acceleration trace in FIG. 4c. At the end of the acceleration spike, the velocity (as indicated in the velocity trace) is up at the impact velocity of the ram. This means, the ram 60, the accelerometer housing 52, the pusher rod 54, and the diaphragm 38 now are all moving in lock-step inward at the impact velocity of the ram. It's now a spring-mass system, with the diaphragm 38 serving as the spring and the ram 60 serving as the mass. This fact governs the remainder of the motion.

The spring constant of the diaphragm may be calculated using well known formulas for edge supported diaphragms. A diaphragm with a simply supported edge is 2½ times more compliant than the same diaphragm with a rigidly supported edge. Note, the twenty-four peripheral openings in diaphragm 38 extend into the unsupported region to form twenty-four separate compliant beams at the edge, thereby creating a situation much closer to the simply supported case than the rigidly supported case. And so it is reasonable to assume diaphragm 38 is two times more compliant than if it had been rigidly supported at the edge. The stiffness calculation—which assumes the use of ¹⁄₁₆ th inch thick 17-4 PH steel—yields a value of slightly less than 8,000 lbs. per inch.

When combined with the mass of the 18 lb. ram, the spring-mass system has a natural period of 15.3 milliseconds per cycle—or 3.8 milliseconds for a quarter cycle: that's the time it takes for the diaphragm 38 to stop the motion of the ram 60 before reversing. Notice, in FIG. 4c, the time of the reversal is independent of the initial velocity, as the solid trace representing an initial velocity of 10 inches per second, and the dotted trace representing an initial velocity of 5 inches per second, both arrive at zero velocity at the same time (3.8 milliseconds), absent any other forces. One related point requires mention. If the stiffness of the parts that support the main housing (i.e., the pipe extension and nipple) is down in the same order of magnitude as the stiffness of the diaphragm, it will slightly increase the natural period stated above. This is to be expected to some extent, and so it should not be surprising if the actual quarter cycle time becomes a little larger. But since the overall support stiffness is just as invariant as the diaphragm stiffness, the actual quarter cycle time (whatever it turns out to be) should be invariant too. It is in this quarter cycle that the compression portion of the pulse is formed, as described in the next paragraph.

The diaphragm 38 creates the compression portion of the pressure pulse by pushing on the medium in front of it. It is the result of the velocity of the diaphragm, not its displacement. So too, the pulse is proportional to (and in phase with) the diaphragm's velocity, not its displacement. The maximum compression pressure is at the beginning of the pulse when the velocity is maximum and the displacement is near zero, not the reverse as some might expect. Still though, a moving diaphragm displaces, and for this particular diaphragm design, an initial velocity of 10 inches per second results in a maximum displacement of about 0.025 inches. By allowing the (up to 150 bar) line pressure to be equalized, the peripheral openings in diaphragm 38 enable it to be thin enough (0.063 inches) to achieve the necessary compliance. The peripheral openings also allow the displaced fluid to move over to the pusher-rod side of the diaphragm during the compression phase, and back again during the rarefaction phase which immediately follows. The rush of fluid through the peripheral openings is not expected to interfere with the pulse created by the diaphragm motion, but whatever the effect, it can be minimized by machining a large return-path area in the main housing 32, below the diaphragm support structure, just above the pressure transducer support plug.

The magnitude of the dynamic pressure formed at the surface of the diaphragm can be estimated from the well-known relationship between dynamic pressure and particle velocity. If oil is the fluid, an impact velocity of 10 inches per second at the center of the diaphragm (which obviously then becomes the particle velocity of the adjacent oil) produces a dynamic pressure of about 50 psi. In natural gas, a 10 inch per second velocity results in a dynamic pressure of 0.02 psi at atmospheric pressure; while at 150 bar, it yields a dynamic pressure of 3 psi. Since not the entire diaphragm surface moves with the same velocity as the center (the periphery doesn't move at all), the effective dynamic pressure magnitudes will be somewhat less—instead of 50 psi, 0.02 psi, and 3 psi, respectively; it would probably be more like 33 psi, 0.013 psi, and 2 psi.

Figure 4D:
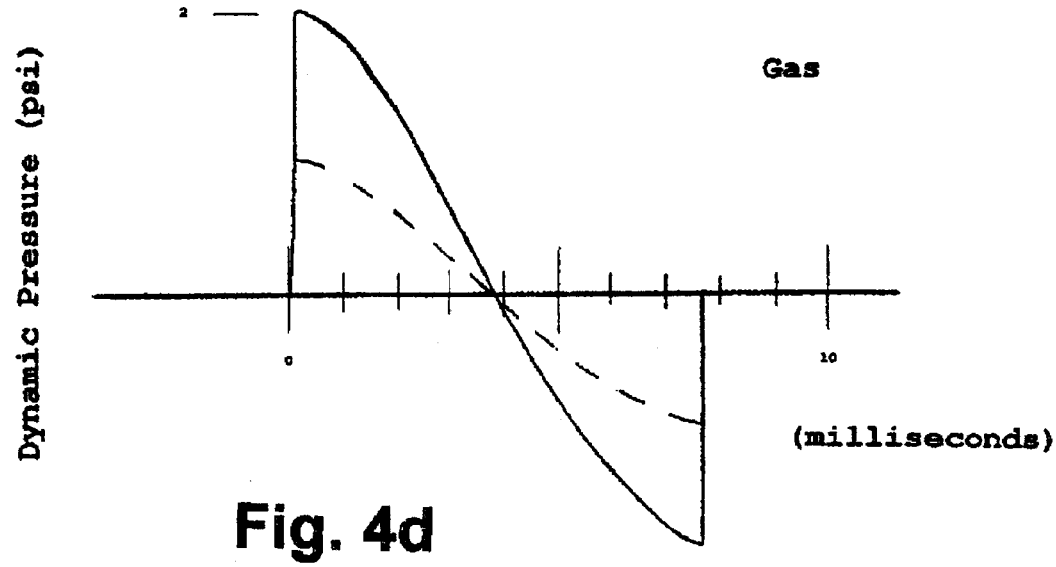
FIGS. 4d and 4e are graphs showing the dynamic pressure pulse generated by the diaphragm, in gas at 150 bar, and in oil at any line pressure, respectively.

This pressure pulse consists of two portions: first a compression portion, then a rarefaction portion; both resulting from, and effectively mirroring, the velocity of the diaphragm 38. FIG. 4d shows the nature of the pressure pulse when the fluid in the line is gas at 150 bar. With a gas, the pressure force is small compared to the diaphragm spring forces (even at line pressures approaching 150 bar), so it's not surprising that the illustrated traces, which are for impact velocities of 10 inches per second (solid) and 5 inches per second (dotted), closely resemble the corresponding velocity traces in FIG. 4c, which showed the motion of the simple spring-mass system without any other forces acting after impact (till the end). Indeed, the traces would look even more identical to those of FIG. 4c, were it not for the slow equalization across the diaphragm which tends to reduce the effective pressure amplitude for slowly varying pressures.

Figure 4E:
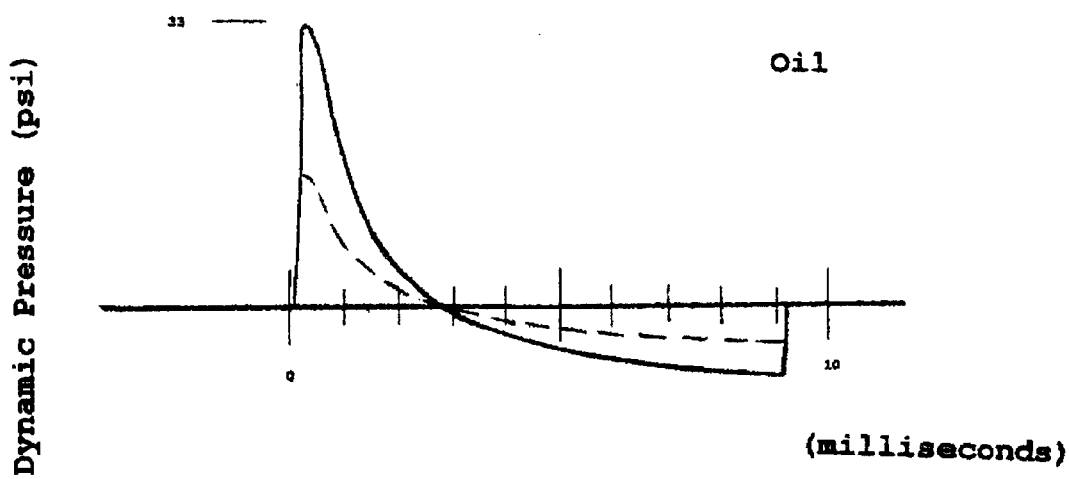

For oil (unlike gas), the line pressure has no affect on the level of the generated pressure pulse. FIG. 4e shows the 10 inch per second (solid) and 5 inch per second (dotted) pressure pulses when the fluid in the line is oil. The traces now look different in character from those of FIG. 4d. They no longer resemble part of a sine wave. The sharp initial compression increase is followed by a rapid concave reduction in pressure, instead of the slower, convex, sine-like, reduction for gas. Also, the rarefaction portion is less intense, more elongated than before. The reason for these differences is, that with oil (unlike with gas), the force the fluid pressure exerts on diaphragm 38 is initially large, and it remains substantial (as compared to the spring force) throughout most of the cycle. Yet as before, the pressure pulse still closely follows the velocity of diaphragm 38, which of course, it resembles. If the fluid in the system is a mixture of gas and oil, the gas bubbles will rise by gravity and oil will fill the main housing of the pulse generator, so this situation should be treated as oil. Regardless of whether the fluid is gas or oil, the system will analyze just the initial portion of the compression phase of the pulse, so the difference in overall wave shape between gas and oil has little effect on its function.

The line pressure (whether gas or oil) tries to "spit out" or reject the pusher rod 44 from the housing 32. At 150 bar, this constant rejection force is approximately 25 pounds, which the diaphragm easily accommodates by deflecting about 3 mils.

If the housing 32 itself moves in response to the impact of the ram 60, (as it will if there is any compliance at all in the support provided by the pipe extension and nipple), there will be generated, two small additional—but self canceling—pressure pulses. Due solely to the main housing 32 moving in a direction away from the ram 60, a compression pulse is generated at the surface of the diaphragm which is canceled by an equal rarefaction pulse generated at the far wall of the housing's blind cavity; and just the opposite occurs while the housing moves toward the ram. So only the already discussed pressure pulse caused by the diaphragm's motion in response to the pusher rod 44 need be considered.

Immediately upon being generated, the pressure pulse begins traveling from the diaphragm, up the pipe extension, into the inner cavity of the valve. If there is a leak in one of the valve's seals, a fraction of the magnitude of that sharp initial pressure pulse Oust how much depends upon the size of the leak) enters the pipe, and propagates through it. By measuring the initial pressure pulse directly at the inner-cavity side of the seals with the pressure transducer, it makes it possible for normalization to be used later to accurately quantify the size of any detected leak. The function of the accelerometer, and other sensors in the system, will be explained in the subsequent discussion.

Figure 5:
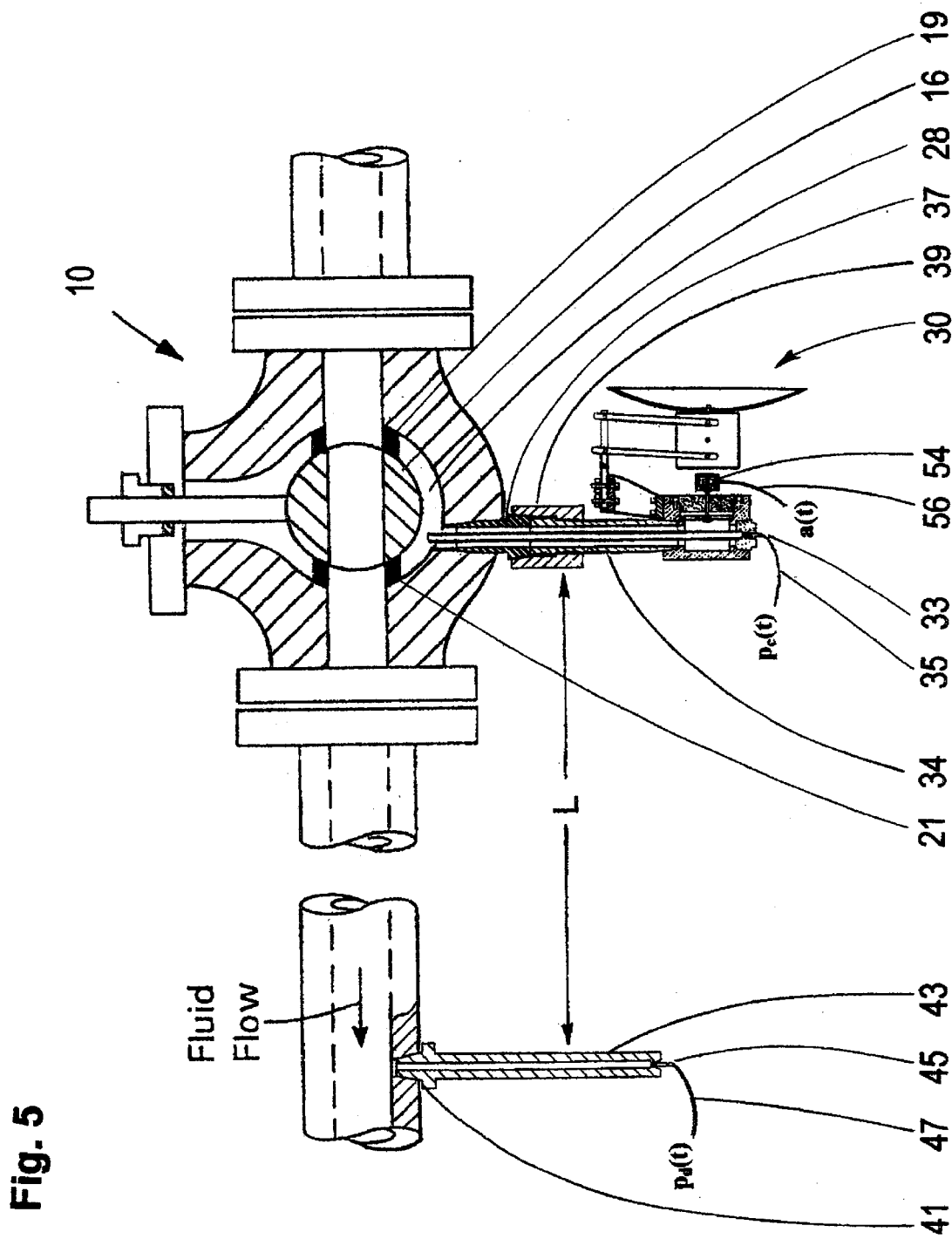
FIG. 5 is a schematic diagrammatic illustration of the valve of FIG. 1 shown in the open (production) position, along with a section of downstream pipe fitted with a pressure tap with the wind driven random pulse generator of FIG. 4.

FIG. 5 shows schematically a ball valve 10 of the type shown in FIG. 1, without a bleed hole in the ball 16, illustrated in the open (production) position. The single illustrated upstream seal 19 represents both the upstream elastomeric ring 18 and the upstream O-ring 24, and the single illustrated downstream seal 21 represents both the downstream elastomeric ring 20, and the downstream O-ring 26.

In addition to nipple 37 and union 39, which connect the pipe extension 34 of wind-driven random pulse generator 30 to the inner cavity 28 of valve 10, there is shown pressure tap 41, located approximately a distance L downstream of valve 10. Pressure tap 41 contains pipe extension 43, which holds pressure transducer 45 in the same way tube 36 holds the inner cavity pressure transducer 33. And as with pressure transducer 33 and tube 36, pressure transducer 45 may be mounted either at the base of pipe extension 43, or at its top in an oil system, when bubbles in the pipe extension might exist and reduce the signal fidelity. Note that the downstream tap 41 could be replaced with a upstream tap located upstream of valve 10 with no change in functionality. Tap 41 is a standard tap of a type typically used on oil or gas platform piping, for example, a standard NPT fitting of a type well known in the art, and capable of sealing the line pressure, and providing fluid communication with the flow stream.

Pressure transducer 45, like the aforementioned pressure transducer 33, is assumed to be the previously mentioned PCB Model 113A20, which can withstand line pressures up to 3,000 psi, and has a self contained amplifier providing an amplified sensitivity of 20 millivolts per psi. However, other dynamic pressure transducers from other manufacturers, or with different characteristics, may be equally suitable.

In response to the dynamic pressures, the two pressure transducers generate representative electrical signals as a function of time. The output signal of the cavity pressure transducer 33, is brought out on cable 35, and is designated $p_c(t)$, while the output of the downstream pressure transducer 45, is brought out on cable 47, and is designated $P_d(t)$. The subscript "c" denotes the cavity location and the subscript "d" denotes the downstream location.

At the base of the valve 10 is mounted a wind driven random impulsive noise generator 30 of the type described in FIG. 4. And with it is the previously discussed accelerometer 54, whose output is brought out on cable 56, and is designated a(t). No subscript notation is required for the accelerometer as it is the only accelerometer in the system.

As indicated previously, and shown in FIG. 4c, the accelerometer sees a substantial acceleration spike commensurate with each impact of the ram 60, and outputs a substantial electrical spike in a(t) as a result. The larger the acceleration spike, the larger the spike in the output electrical signal a(t), in proportional fashion.

The output of the accelerometer is fed into a trigger circuit (not shown) which senses the signal a(t), and at the instant the signal exceeds a certain preset level, the circuit puts out a trigger signal denoting t=0. Such trigger circuits are well known in the art, and commonly employed. The preset level is set so that taps of the ram against the anvil of less than a useful magnitude will not result in a trigger.

The cavity pressure signal $p_c(t)$ and the downstream pressure signal $p_d(t)$ are each routed to one input channel of an analog to digital converter, or ADC (not shown), while the output of the trigger circuit is routed to the trigger input of the ADC. There are several inexpensive commercially available ADC's, and Model LTC1605 from Linear Technology Corporation is only one of many that may be suitable. At the t=0 trigger signal, the ADC begins sampling and digitizing the two analog signals. The sample rate per channel is preferably high, about 20,000 samples per second per channel, sufficient to insure that several samples will encompass the initial pressure peaks shown in FIGS. 4d and 4e. At the indicated sample rate, that's a sample every 50 microseconds for each channel. Model LTC1605 features an overall sample rate of 100,000 samples per second, so it can actually handle up to 50,000 samples per second per channel for two channels. Following each trigger, there's a one-to-one correspondence between sample number and time, so time can be represented in terms of sample numbers instead of microseconds. In the subsequent discussion, $p_c(16)_{12}$ for instance, represents the sixteenth sample of the cavity pressure signal following the twelfth trigger. At 20,000 samples per sec per channel, there could be a lot of samples, but as will be seen, the number of samples that need be captured with each impact, and the number that need to be saved are small.

Determining which samples need to be captured first requires a discussion about how the pressure signal propagates through the oil and the gas fluid media. It is important that following the impact, the captured signals $p_c(t)$ and $p_{d(t)}$ represent the ensuing pressure pulse that has traveled through the fluid, not through the steel of the valve and pipe. A pulse that's traveled through the fluid to the downstream pressure transducer location will have gotten there only through a leak in one of the seals, either the upstream or downstream seals, while the valve is open in the production mode as shown in FIG. 5. The larger the leak, the greater the amount of pressure pulse magnitude gets through, in approximately proportional fashion. So the magnitude of the downstream pressure pulse, compared to the magnitude of the same pressure pulse in the inner cavity, is a good indicator of the magnitude of the leak. But again, only if the pressure pulse has traveled through the fluid, not the steel.

The ability to separate out a pressure pulse that has traveled through the fluid from one that has traveled through the steel, is just one of the advantages of this invention. It and several other advantages yet to be discussed, require that the signal remain in the time domain; and not be brought into the frequency domain for analysis. That means there are no spectra, no frequency response functions (FRF's), no transfer functions, no coherence functions; all of which are functions of frequency. (Clearly, this is a major difference between the current invention, and the previously cited invention of this inventor and Heagerty.)

The approximate separation distance between the cavity and the downstream (or upstream) transducer (L in FIG. 5) needs to be known, as does the speed of sound through natural gas (hydrocarbon gases), oil, and steel. Sound travels through natural gas at slightly less than 1,000 feet per second; through oil at about 4,400 feet per second; and through steel at about 17,000 feet per second. So every millisecond (every 20 samples in our example), sound travels 1 foot through natural gas, 4½ feet through petroleum, and 17 feet through steel. Furthermore, the line pressure has almost no effect on these speeds, even up to 150 bar (and beyond). If the fluid in the system is a mixture of oil and gas, then for the purposes of this invention, it should be assumed to be oil (especially at high ambient pressures, where the gas will be in the form of small entrained bubbles).

If pressure transducer 45 is located fifty feet downstream of valve 10, a pressure pulse traveling through the steel will begin to be seen by the downstream pressure transducer after 3 milliseconds, or the 60th sample, designated $p_d(60)$. A pressure pulse traveling through oil will begin to be seen after 11 milliseconds or the 220th sample, designated $p_d(220)$. And one traveling through natural gas won't reach the downstream pressure transducer for over 50 milliseconds or the 1,000th sample, designated $p_d(1000)$. The flow velocity of the fluid in the pipe is typically smaller than 100 feet per second, and thus only slightly reduces these delay values. If the pressure transducer site had been located upstream rather than downstream, the travel times through the fluid would be increased by the flow velocity rather than decreased, but again, only slightly.

In addition to the time delay at the downstream transducer site, the pressure pulse will be slightly spread out in time, compared to the same pulse, seen earlier at the cavity site. This is due partly to a slight amount of dispersion (different frequencies that make up the pulse, traveling at different speeds), and partly to multiple paths through the wide pipe opening (that is, more than just the straight line path). The result is that a small amount of spreading of the pressure peak will be seen at the distant location. Generally, the greater the distance, the greater the spread, but at fifty feet the effect should still be small.

Nevertheless, though 10 milliseconds may be more than adequate to accommodate the initial pressure pulse at the cavity location, additional time should be allotted for the signal obtained downstream (or upstream) to deal with the spread, and any uncertainties in the travel time. The greater the distance from the valve, the greater this additional time allotment. A good rule of thumb might be an additional 0.1 milliseconds per foot for oil, and additional 0.4 milliseconds per foot for gas. Thus, with the downstream pressure transducer located fifty feet from the valve, a record length of 30 milliseconds (or 600 samples at 20,000 samples per second) should cover all cases.

But the timing (after the t=0 trigger in each case) of the 600 samples obtained from the far pressure transducer signal still needs to be taken into account. It's based entirely on the distance from the valve, and the speed of sound in the fluid medium. Using the previously stated travel times, if oil is the fluid, samples $P_d(201)$ through $p_d(800)$ should be acquired; and if gas is the fluid, samples $p_d(901)$ through $p_d(1500)$ should be acquired. There won't be much energy going through the steel—the impact of the ram 60 against the anvil 58 makes more of a thump than a bang, and it's also decoupled by the diaphragm 38—but whatever energy there is will arrive well before the 201st sample (around the 60th sample), so the initial pressure pulse traveling through the steel is inherently eliminated simply by eliminating the early samples from the record.

A sampled record for the downstream pressure transducer output, $p_d(t)$ is obtained after each triggered impact. For oil, the first record would be $p_d(201)_1$ thru $p_d(800)_1$; then $p_d(201)_2$ thru $p_d(800)_2$; . . . up to and including $p_d(201)$n thru $p_d(800)$n following the nth triggered impact. Similarly for the cavity pressure transducer output, $p_c(t)$, a 600-sample record would likewise be obtained, but starting with $p_c(1)$ and going up to $p_c(600)$. With the cavity situated so close to the impact source, it's impossible to eliminate all metal-borne sounds, but they'll be small in comparison to the fluid-borne pressure pulse and should be easily overwhelmed by it. Thus the sampled cavity pressure transducer records (corresponding to the sampled downstream pressure transducer records above), would be $p_c(1)_1$ thru $p_c(600)1$; then $p_c(1)2$ thru $p_c(600)_2$; . . . up to and including $p_c(1)$ thru $p_c(600)$n following the nth triggered impact. Assuming just seven triggered impacts a minute, 10,000 pairs of records can be obtained in less than a day. The purpose of obtaining so many records is to be able to average away the flow noise and other noises, leaving an unambiguous result with respect to whether or not a seal leak of any significance exists. The less noise that remains after averaging, the smaller the seal leak that can be seen. The noise reduction is accomplished through a process known as synchronous time averaging. With each record already synchronized to the trigger, everything not related to the impact can be slowly, synchronous time averaged away.

Figure 5A:
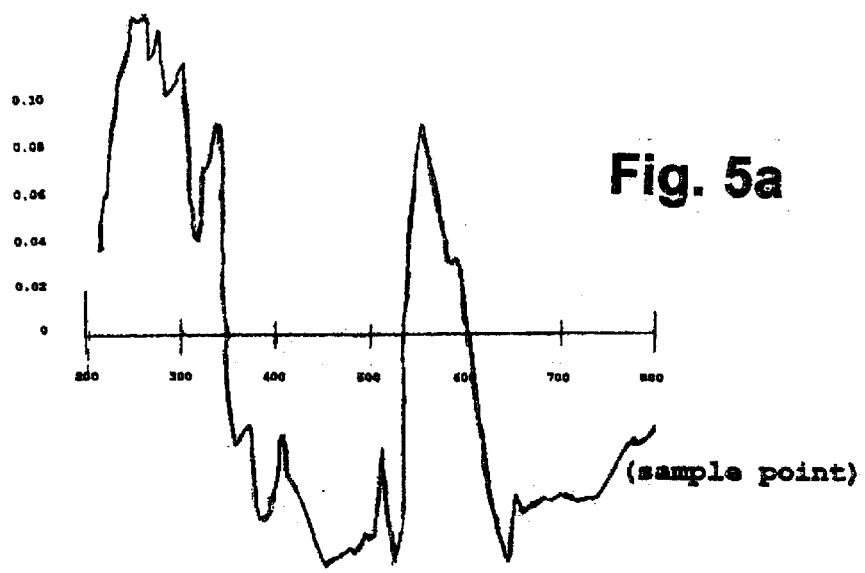
FIG. 5a shows a single downstream pressure record.
Figure 5B:
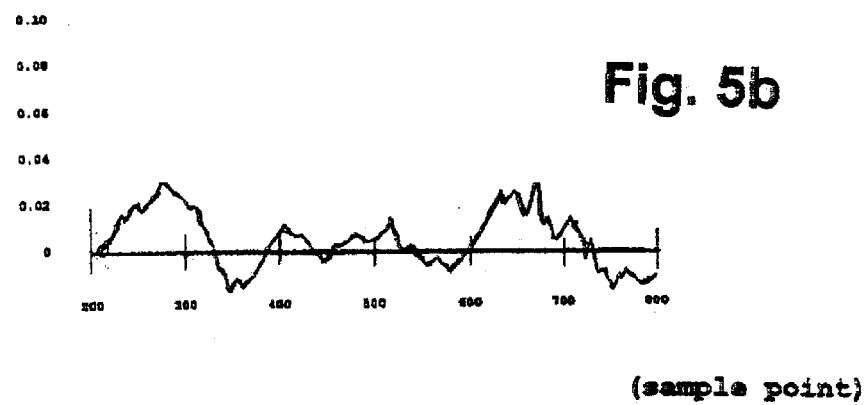
FIG. 5b shows the result of synchronous time averaging 100 records (such as in FIG. 5a)
Figure 5C:
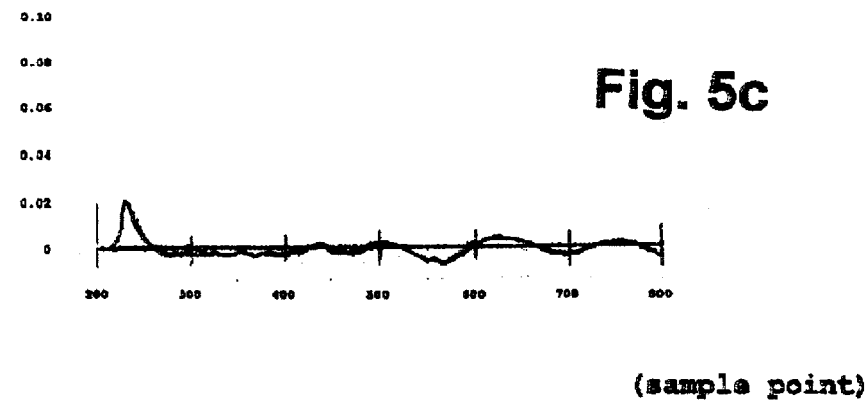
FIG. 5c shows the result of synchronous time averaging 10,000 records (such as in FIG. 5a)

The synchronous time averaging process is simple, and can be performed on the fly (in real time) by any of a number of commercially available inexpensive digital signal processors, or DSP's, such as Model TMS320C67×from Texas Instruments. In the process, all like samples from each like record, (for example, $p_d(456)_1$ and $p_d(456)_2$ etc., . . . up to and including $p_d(456)_n$) are added algebraically (including their + and − signs), and the result is divided by the number of records, n. Everything resulting from each ram impacts (like the pressure pulse) will remain, and everything not related to each ram impacts (like flow noise, pump noise, ocean wave noise, other impulsive noises, and other periodic noises) will average away. The rate at which those other noises average away, is by a factor of ten for every factor of a hundred averages. Thus for 10,000 averages (averaging 10,000 records), any noise unrelated to the ram impacts will be averaged away by a factor of a hundred. (10,000 is a hundred times a hundred. And with a factor of ten noise reduction for each factor of a hundred, there's a hundred-fold noise reduction.) Thus even in the open (production) mode, relatively small seal leaks should be able to be seen, and can be trended on a daily basis to note any further degradation. FIG. 5a shows a single downstream pressure transducer record, that might be obtained during production on an oil platform. FIG. 5b shows the result of synchronous time averaging 100 such records, and FIG. 5c shows the result of synchronous time averaging 10,000 such records. Notice that the first 100 averages reduces the noise by a factor of ten, and the second "factor of 100" synchronous time averages (going from 100 averages to 10,000 averages) reduces the noise by another factor of ten, uncovering the seal leak signature, initially buried in the noise.

However, even with 10,000 synchronous time averages, it's possible that one set of 10,000 downstream pressure records might have been obtained with larger impacts resulting from higher winds driving the wind driven impulsive noise generator 30, than another set of 10,000 records obtained on a less windy day. This would render comparisons of the synchronous time averaged pressure records useless and make it difficult to quantify a detected seal leak, even on a relative basis. The problem is solved through the following normalization procedure.

With each set of synchronous time averaged downstream pressure transducer records, the associated cavity pressure transducer records are also synchronous time averaged as described above. The highest positive sample point is then noted in the synchronous time averaged cavity pressure record, which corresponds to the pressure peak in the cavity. Next, every sample-point in the associating synchronous time averaged downstream pressure record is divided by the same peak cavity pressure, thereby normalizing that associated synchronous time averaged downstream pressure record. This process helps make the normalized synchronous time averaged downstream pressure records independent of the magnitudes of the impacts that caused them, thereby enabling proper trend comparisons, and proper seal leak evaluations.

Figure 5D:
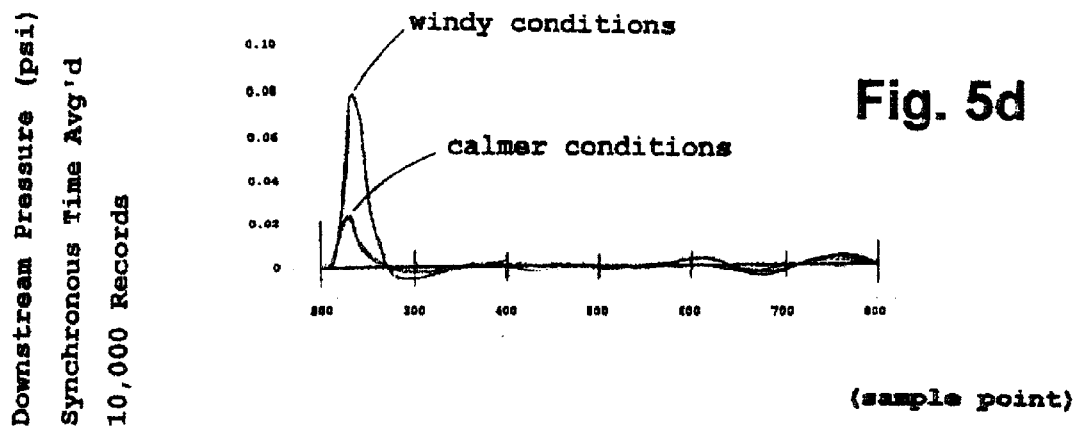
FIG. 5d shows two synchronous time averaged downstream pressure records, one obtained during windy conditions, and one obtained during calmer conditions.
Figure 5E:
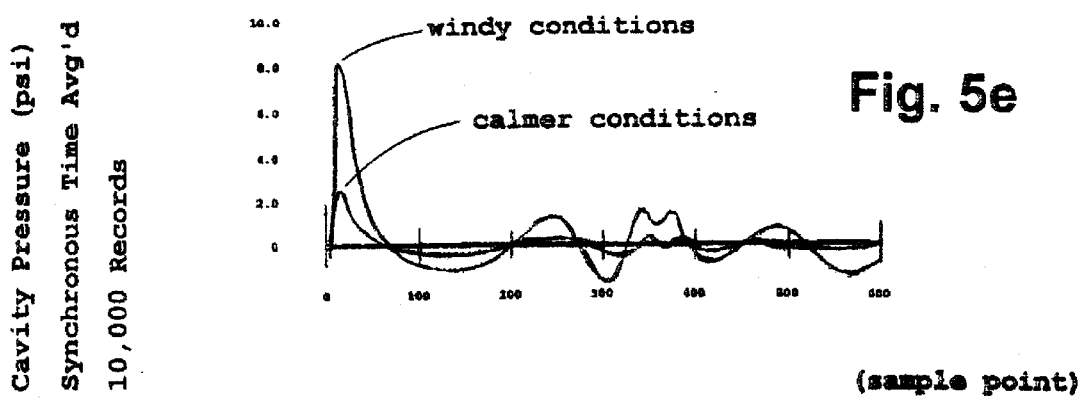
FIG. 5e shows two synchronous time averaged cavity pressure records, one obtained simultaneously with the windy condition record in FIG. 5d, and the other obtained simultaneously with the calmer condition record in FIG. 5d.
Figure 5F:
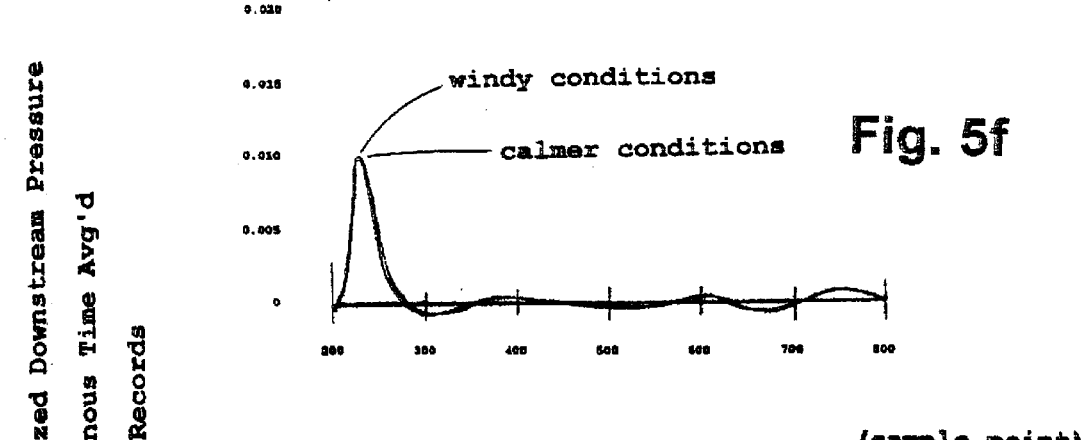
FIG. 5f shows the two synchronous time averaged downstream pressure records of FIG. 5d after normalization, accomplished by dividing each record by the peak pulse magnitude in the associated synchronous time averaged cavity pressure record of FIG. 5e.

FIG. 5d shows two un-normalized synchronous time averaged downstream pressure records for the same seal leak condition, and FIG. 5e, the associated synchronous time averaged cavity pressure records, all as they might appear if the top traces were the result of data taken on a very windy day, and the bottom traces were the result of data taken on a calmer day. FIG. 5f shows the two synchronous time averaged downstream pressure records of FIG. 5d after normalization by dividing by the peak pressure value obtained from the associated synchronous time averaged cavity pressure records. Notice how the two normalized results are nearly identical, as they should be. Also notice they are dimensionless.

Normalization makes a big leak always look like a big leak, and a small leak always look like a small leak, regardless of wind conditions. It's one of the features (others will be discussed later) that enables this invention to separate an acceptable leak from an unacceptable one.

When a bleed hole exists in the ball of the ball valve, as in the valve 110 in FIG. 2, one additional step is required in the analysis to show whether a seal leak exists in the open (production) condition. In the open (production) position, the bleed hole itself acts as a large seal leak, allowing the pressure pulse from the wind driven random pulse generator to go directly from the cavity into the flow stream through the hole. See FIG. 6. When the valve is closed, the bore of the ball no longer communicates with the flow stream, so in the closed (shutdown) position, this is not a problem.

In the aforementioned previous invention (Leon and Heagerty), for the open (production) position, pressure pulsations generated by the flow of the fluid in the pipe are utilized (not a pressure pulse), and the coherence (as a function of frequency) between a cavity pressure transducer signal on the one hand and an upstream (or downstream) pressure transducer on the other, is used to determine a seal leak. A high coherence (with values approaching 1.0) at low frequencies indicates the flow pulsations are getting into the cavity, and therefore a leaky seal is presumed. But even a small seal leak can result in coherence values that approach 1.0 (the maximum coherence value), so additional leakage is nearly impossible to detect. For this reason, the previous invention is inherently unsuitable for production use with ball valves having bleed holes.

This is not the case, however, with the present invention. Here, the pulse magnitude, as measured at the downstream pressure transducer location, increases in approximately linear fashion, in proportion to the size of the seal leak. This is not to imply that the relationship is perfectly linear. However, it's far more linear than the coherence measurement cited above. So with the present invention, an incremental increase in seal leakage area from 100 mm$^2$ to 101 mm$^2$ will be almost as easy to detect as the first 1 mm$^2$ of seal leakage. This is in stark contrast to the previous invention's coherence scheme, where additional leak increments become harder and harder to discern; and with the existence of a bleed hole, the ceiling value of 1.0 may already be asymptotically reached.

Figure 6:
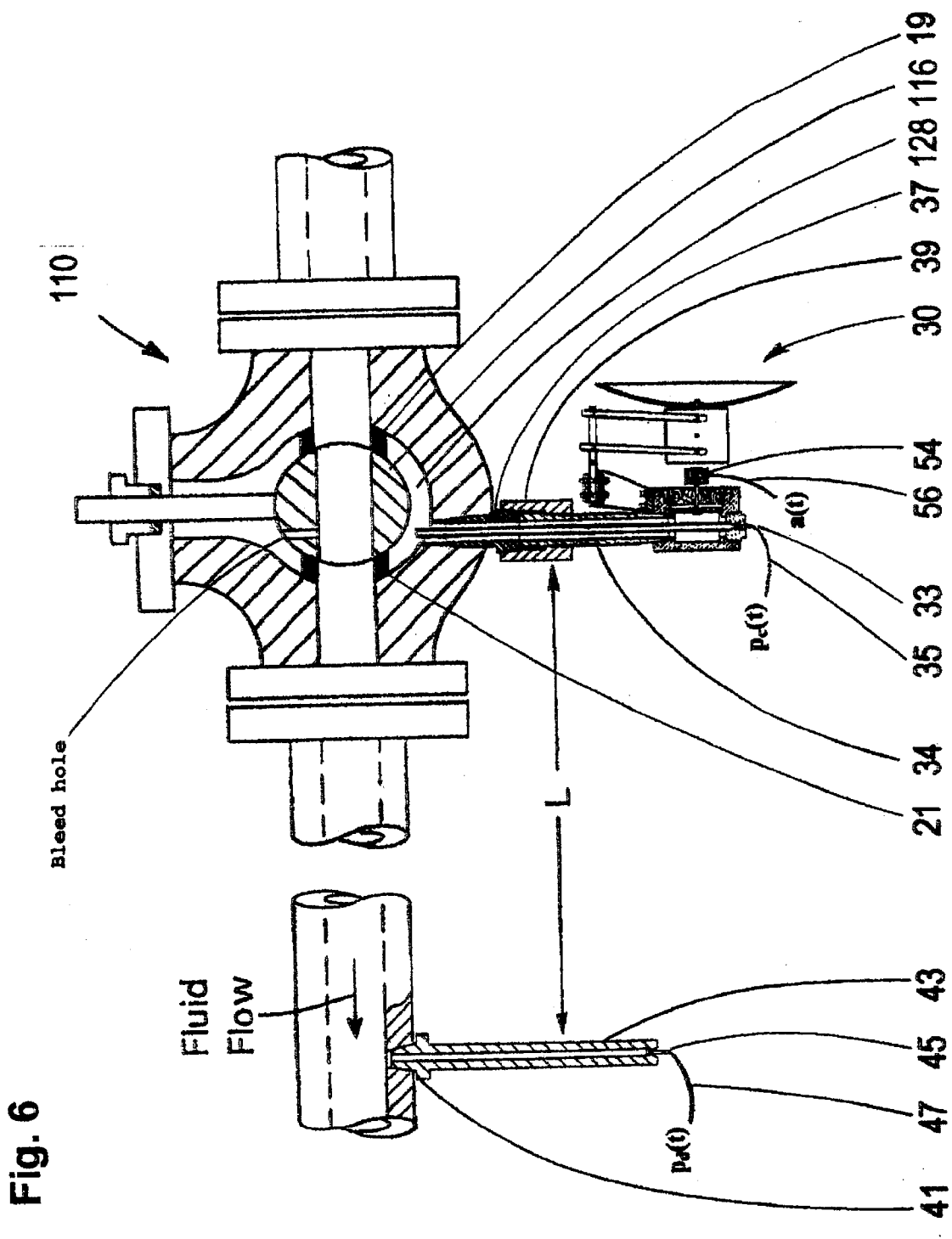
FIG. 6 is a schematic diagrammatic illustration of the valve of FIG. 2 (with a bleed hole) shown in the open (production) position, along with a section of downstream pipe fitted with a pressure tap with the wind driven pulse generator of FIG. 4.

Because the present invention does not suffer the inherent and severe linearity problem of the previous invention, it is feasible to test ball valves with bleed holes for seal leaks in the open (production) mode using already discussed procedures in slightly modified form. The method is as described before, with the following additions:

When a ball valve with a bleed hole is initially installed, as in FIG. 6, a normalized synchronous time averaged downstream (or upstream) pressure record can be obtained in the open (production) mode as previously described. Clearly, as a result of the bleed hole, the record will indicate significant "seal" leakage, even though the seals themselves, being newly installed, are presumed to be not leaking. This initial record is then archived for future reference. Whenever future normalized synchronous time averaged downstream pressure records are taken, the past normalized pressure peak from the archived normalized synchronous time averaged record is subtracted from the new normalized synchronous time averaged pressure peak, and since no change is presumed to have occurred to the bleed hole (and assuming no change in sensor sensitivities), any non37859 zero positive residual can be logically attributed to seal leakage, the size of the residual indicating the size of the leak.

Figure 6A:
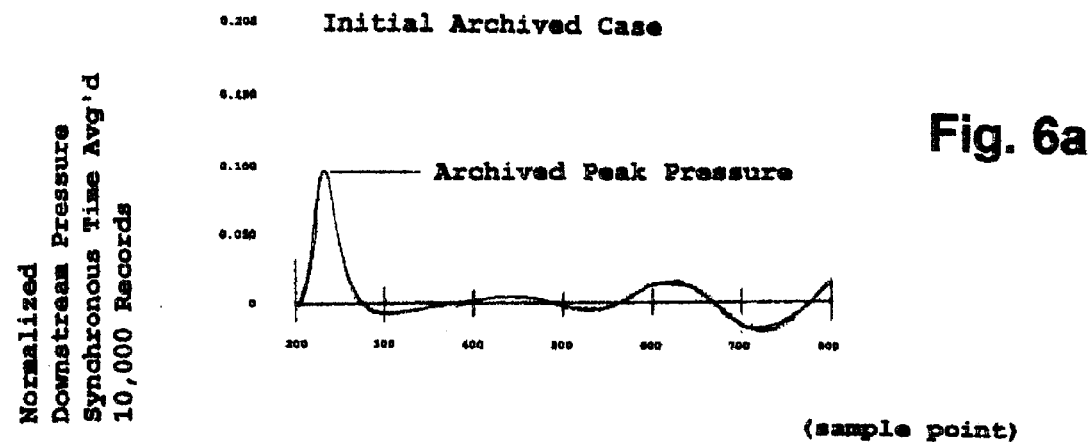
FIGS. 6a, 6b, and 6c illustrate a long term sequence of open (production) mode normalized results for the valve of FIG. 6, showing no residual difference with the archived pressure pulse after three months (no seal leakage), but a residual difference after six months indicative of a seal leak.
Figure 6B:
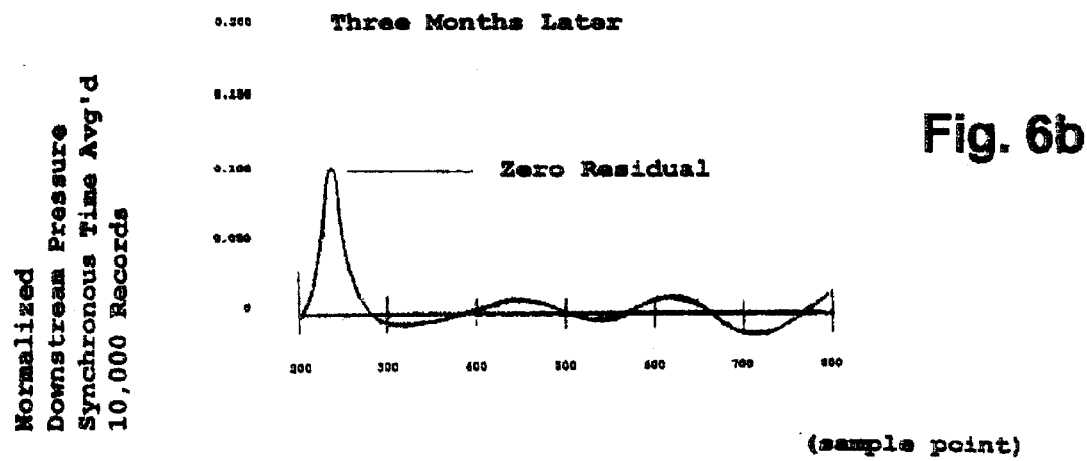
Figure 6C:
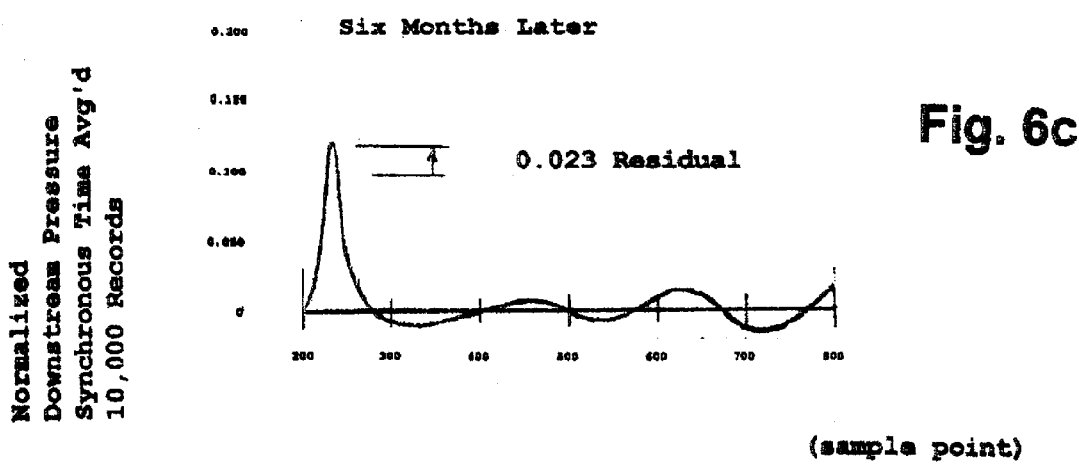

FIG. 6a illustrates a normalized synchronous time averaged downstream pressure record obtained shortly after installation, in the open (production) mode on an ESD ball valve having a bleed hole in the ball. FIG. 6b illustrates a normalized synchronous time averaged downstream pressure record obtained three months later, where the pressure peak is unchanged, indicating no seal leakage; and FIG. 6c, a normalized synchronous time averaged downstream pressure record obtained six months later, where now a larger pressure peak is noted (a positive residual) indicating new seal leakage, the amount of the dimensionless residual (0.023) indicating the size of the new leak.

Clearly, the same system can be used for trending changes in seal leak condition for ESD ball valves of either type. The normalized synchronous time averaged pressure record for the previous time for which a comparison is desired, is simply used in place of the archived initial normalized synchronous time averaged pressure record. It should be obvious that the entire normalized synchronous time averaged pressure record need not be saved, only the normalized peak pressure values have to be dated, and stored for future comparisons purposes.

The procedures already discussed can also be used in the closed (shutdown) condition to evaluate seal leak integrity and changes in seal leak integrity for ESD valves of either type. In the closed condition, an important additional plus is realized, that being the ability to distinguish the integrity of the upstream seals separately from the integrity of the downstream seals. Also in the closed position, there is no longer any need to deal any differently with ball valves that have bleed holes.

Figure 7:
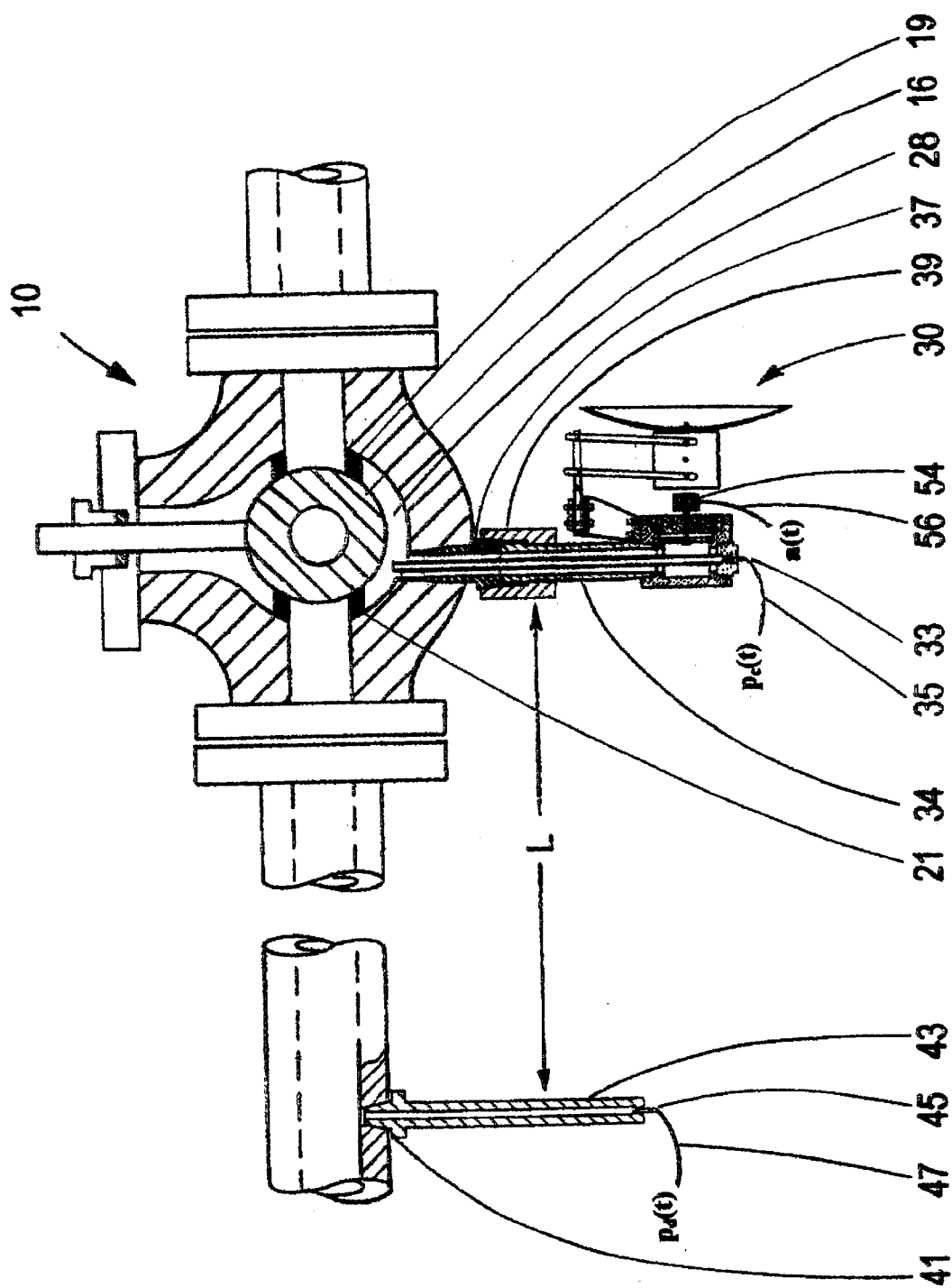
FIG. 7 is a schematic diagrammatic illustration of the valve of FIG. 1 or FIG. 2 shown in the closed (shutdown) position, along with a section of downstream pipe fitted with a pressure tap and with the wind driven random pulse generator of FIG. 4.

FIG. 7 illustrates valve 10 of FIG. 1 (or valve 110 of FIG. 2) in the closed (shutdown) position, shown with the attached wind driven random pulse generator 30 and a section of downstream pipe, and all the previous sensors. Everything is exactly as before, except for the position of the valve, and of course, the no flow situation.

Another important difference is how the seals now relate to the upstream and downstream piping. Before, with the valve open, both the upstream and downstream seals communicated with the same flow stream. But now, the upstream seals communicate only with the fluid in the upstream piping and the downstream seals communicate only with fluid in the downstream piping. This situation is what enables the present invention to evaluate separately, the integrity of the upstream seals and the integrity of the downstream seals. It can be accomplished using the sensor arrangement of FIGS. 5 and 7 with only a downstream pressure sensor, not an upstream pressure sensor (or vice versa). The procedure is as follows:

Two normalized synchronous time averaged downstream pressure records are obtained, one in the open (production) mode, and one in the closed (shutdown) mode. The essential criterion is that they not be separated very much in time, so that effectively, they'll represent an unchanged seal leak condition; in other words, the two records should be separated by days instead of months.

With the pressure transducer located downstream, as indicated in FIGS. 5 and 7, the closed (shutdown) mode pressure peak is an indicator of the magnitude of the downstream seal leak only. However, the open (production) mode pressure peak is an indicator of the total seal leak magnitude, an almost linear combination of the upstream and downstream seal leak magnitudes. Because the two tend to add in the open (production) record, the closed (shutdown) record can be treated as the archived record in FIG. 6a, and its normalized pressure peak subtracted from that of the open (production) record to yield a residual value which will be a good indicator of the upstream seal leak magnitude. Thus it's not necessary to have an upstream pressure transducer to separate out the upstream seal leak condition.

It should be noted that the time of arrival of the pulse at the downstream pressure transducer may be slightly different in the open (production) mode than in the closed (shutdown) mode due to the flow velocity of the fluid medium in the open mode. But since the start of sampling has already been adjusted to accommodate that earlier arrival time, it can accommodate the on-time arrival in the closed (shutdown) mode as well. However, the pressure peaks seen in the two modes will not line up. This is okay, because the total records aren't being subtracted, only their normalized pressure peak values.

Figure 8:
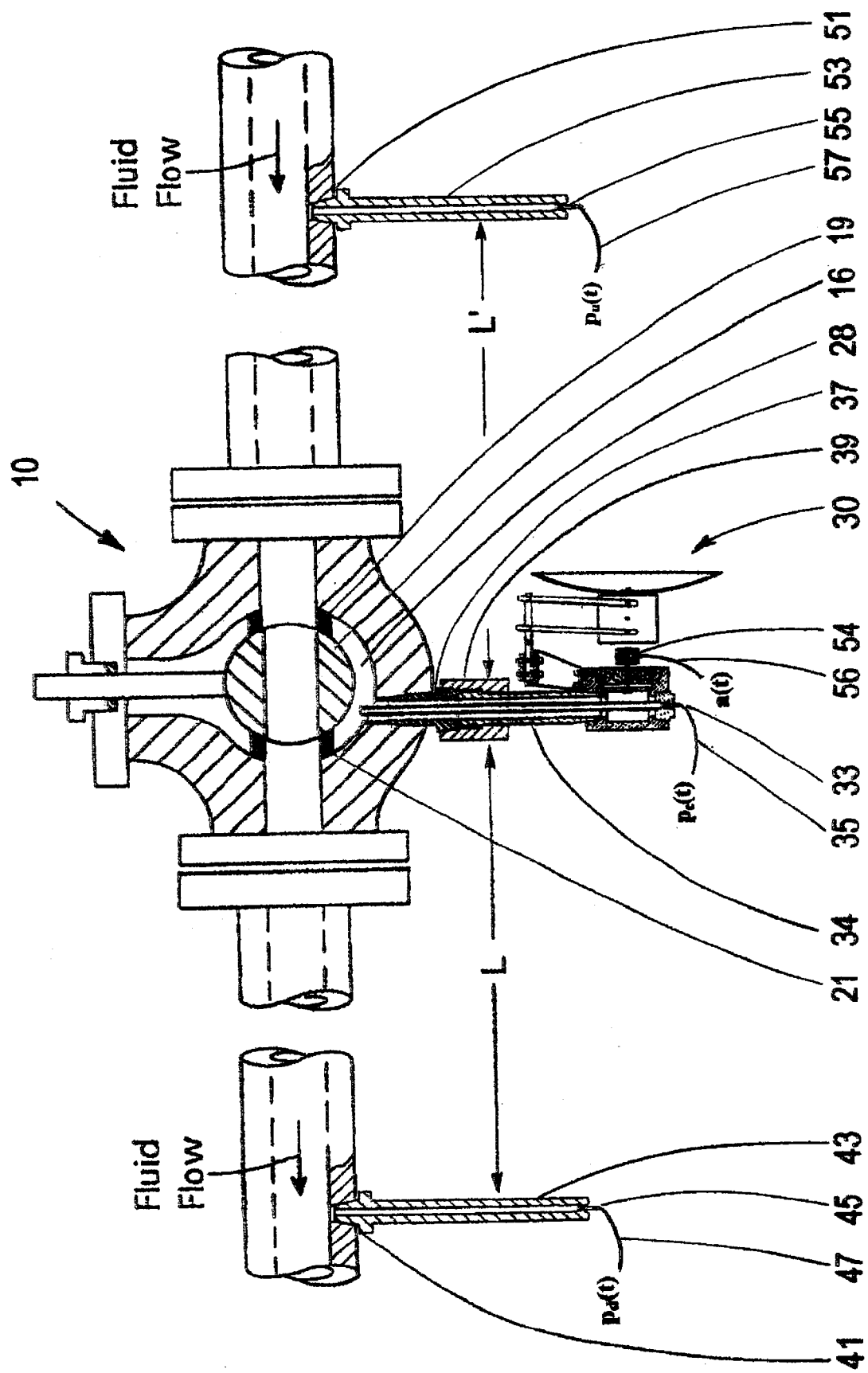
FIG. 8 is a schematic diagrammatic illustration of the valve of FIG. 1 shown in the open (production) position, along with a section of downstream pipe and a section of upstream pipe, each fitted with pressure taps with the wind driven random pulse generator of FIG. 4.

In FIG. 8, the further addition of an upstream pressure tap 51 is illustrated (located a distance L' from the valve). Also shown are pipe extension 53, pressure transducer 55, and pressure transducer cable 57. The upstream tap 51, pipe extension 53, pressure transducer 55, and cable 57 are identical to the downstream tap 41, pipe extension 43, pressure transducer 45, and cable 47. Along with the other pressure transducer cables, cable 57 is routed to the ADC (not shown), and carries signal $p_u(t)$.

With the upstream pressure transducer now included, there is no need to subtract the normalized downstream pressure peak obtained in the closed (shutdown) mode from the normalized pressure peak obtained in the open (production) mode, to indicate the upstream seal leakage condition. The normalized synchronous time averaged pressure peak from the upstream pressure transducer in the closed (shutdown) mode indicates the upstream seal leak magnitude directly. And the normalized synchronous time averaged pressure peak from the downstream pressure transducer in the closed (shutdown) mode indicates the downstream seal leak magnitude as before. So, no open (production) data is required to determine the separate upstream and downstream seal leak magnitudes.

Trending normalized synchronous time averaged pressure records of like mode (either closed, or open) can be accomplished directly by trending their peak pressure values as indicated previously.

Although it is obviously advantageous to use both an upstream and downstream pressure transducer (instead of just an upstream or a downstream pressure transducer), it is not always feasible to do so. Sometimes for safety reasons, or for other reasons, it is not possible to put a pressure tap either upstream of the valve or downstream of the valve, depending on valve's location and function. In that case, the method discussed previously with either just an upstream or a downstream pressure transducer will have to suffice for separately evaluating the upstream and downstream seal leak magnitudes.

But when it is feasible to install both an upstream and a downstream pressure transducer, that is considered the preferred method for several reasons. First, newly installed valves will be able to be non-intrusively checked for upstream and downstream seal leaks in the closed (shutdown) situation, before going back into production. Second, with just a single pressure transducer in the piping (either upstream or downstream), the evaluation of the leak condition of the seal on the side away from the pressure transducer using a previously obtained open (production) pressure record, will be inherently less accurate than with a pressure transducer both upstream and downstream. Third, in the open (production) mode, the two pressure transducers provide a check on each other regarding the total seal leak condition and the trending of that total seal leak condition, and provide for sensor redundancy in the event of failure of a transducer or a cable.

A discussion is now in order regarding the importance of being able quantify detected seal leakage, and the ability of the present invention to do so, particularly in comparison to the aforementioned previous invention. Small seal leaks are acceptable in certain ESD valve applications, so it is important to be able to quantify the size of a seal leak to see which valves have acceptable leaks, and which do not. Different categories of acceptability are often set up, based on leakage rate. One producer with platforms in the North Sea, has set up three categories for ESD valves on its gas platforms. All the given leakage rates are based on a 200 bar line pressure. Valves exhibiting leakage rates greater than 4,500 std $m^3$/hr at that pressure are said to require immediate action. For leakage rates between 450 and 4,500 std $m^3$/hr, individual evaluation is required. And for leakage rates less than 450 std $m^3$/hr, no immediate action is required. Similar liquid leakage rate criteria at given line pressures are set up for oil rig ESD valves as well. It may be reasonably asked, why is any leakage rate acceptable? One answer is that zero leakage rate is nearly impossible to achievable in a practical world. That said, some criteria for acceptability needs to be set up, and the criteria usually relates to what leakage rate is safely within the fire fighting capability of the onboard fire control system.

The leakage rate acceptability numbers are usually intended for through-the-valve leaks, where both an upstream and a downstream seal is leaking. Yet a more conservative application of the criteria can be adopted, with the criteria being applied to either the upstream or the downstream seals. In that case, a valve might be considered to leak unacceptably even without a through leak. Either way, for quantification purposes, it's important to be able relate the peak pressure values in the normalized upstream or downstream synchronous time averaged pressure records to actual leak opening sizes (and actual leakage rates at given pressures).

For the present invention, this might be as simple as knowing the pipe diameter. On careful reflection, one sees that the problem has been reduced to determining what percentage of a pressure pulse on one side of a small opening (the leak), radiates through the opening to the other side and propagates through the pipe. Though the pipe diameter matters, the distance through the pipe to the downstream (or upstream) pressure transducer location should make little difference, as the fixed pipe diameter allows no spatial spread, and therefore results in little attenuation. There are just three variables involved, two of them being measured and combined into one dimensionless ratio, the normalized peak pressure. The other variable is the size of the opening (the leak). Indeed, the answer may even be calculable. Moreover, the answer should be applicable to all situations, regardless of valve internal cavity geometry, downstream or upstream pipe bends or discontinuities beyond the pressure transducer locations, pipe run lengths, etc. This is made possible by the present invention isolating and measuring only the initially-arriving pressure peak of the traveling pressure pulse, before it's had a chance to reflect from those pipe discontinuities, and be affected by natural frequencies and natural modes to form standing waves. Without that isolation, the result would be amplification at unknown anti-nodal locations and attenuation or cancellation at unknown nodal locations, with a similar thing of course occurring inside the inner cavity, all of which would convert a straightforward quantification situation into a morass of complexity for each individual valve and individual pipe geometry. Limiting the analysis to just the initial pulse avoids all that complexity, and the quantification situation in the present invention remains simple.

Quantification, however, is not so simple with the aforementioned previous invention (Leon, Heagerty), and may not even be achievable. Notice above that the leakage criteria for "no immediate action" is still quite high. For leak magnitudes much less than this, the coherence could already close to 1.0, thereby making it difficult (if not impossible) to discern an acceptable leak from an unacceptable one. Thus, though leakage quantification is theoretically possible with the methodology described in the previous application, it isn't practical. The methodology of that invention is more suited for determining, leakage vs no leakage, rather than for quantifying leakage. If the situation were that absolutely no leakage was acceptable, then that invention would be more useful.

For ESD valves in the closed (shutdown) position, the aforementioned previous patent application describes two different methodologies, one for when differential pressure still exists across the valve, and that differential pressure is known or can be measured. But even in the presence of a major single seal leak, if no through leak exists, the method cannot be used. The reason is, the method relies on detecting the sound of the fluid being forced through the leak by the differential pressure, and if there's no through leak, no fluid can be forced through in a sustained manner. Just a low-valued auto-spectrum will be obtained from the cavity transducer, with a characteristic 1/f shape indicating no leak. But with a through leak, the noise generated in the low frequency range increases the spectral floor, particularly around cavity natural frequencies, which are typically less than a few hundred Hz. If the differential pressure is known or can be measured, an approximate quantification of the seal leakage of the lesser leaking seal (the noisier one) is feasible, but only after significant pre-testing to relate various leakage conditions (leak size and differential pressure) to the sound spectrum from the cavity pressure transducer. The method differs from standard acoustic emission approaches which use considerably higher frequencies, usually well above 10 KHz.

Since differential pressure may not always be present across a closed ESD valve, and if present, may not always be known or measurable, the previous patent application puts forth a second methodology that initially seems very similar to the methodology of the present invention. Yet it differs in several very significant ways that will be made clear in the following discussion.

This second methodology of the previous invention for closed ESD valves, makes use of an external sound source, which is preferably installed in the pressure tap of the valve cavity, as is the wind driven random pulse generator of the present invention. The sound from the external sound source is picked up upstream or downstream (or both) when the valve is closed, and compared to the sound near the source to determine the existence of upstream and downstream seal leaks, and that comparison is then somehow used to determine the size of those leaks. At fist glance, that sounds very similar to the present invention . . . but it's not. The nature of the noise sources in the two inventions is very different, the analysis methodology is very different, and the practicality and applicability are very different as well. The following paragraphs will delineate those differences.

The external sound source in the previous patent application, is described as putting out either a sinusoidal sound at a fixed low frequency, or a repetitive click at a fixed periodic rate, but not random pulses as in the present invention. As stated in the previous patent application, the purpose was to generate a single discrete frequency component in the low frequency FRF or coherence spectrum (or better yet, five harmonic discrete frequency components with the repetitive click) which could be discerned above the broadband components stemming from other on-the-platform background random noises during shutdown which both the inner cavity sensor and the downstream or upstream sensor would pick up, and which would be coherent as a result (even though they have nothing to do with a leak). The discrete components from the external sound source can only be discerned when the background sound energy at those discrete component frequencies is substantially lower. If the reverse is true, as would surely be the case for the open (production) mode, the external sound source becomes unusable, as is clearly stated the previous patent application. Thus, its use is limited to the closed (shutdown) mode only.

Indeed, the previous patent application states that would be true even if synchronous averaging were employed. So why doesn't synchronous averaging work in the open (production) mode for the previous invention? What is different about the two inventions that enables synchronous time averaging to be so effective in the present invention, and not in the former? The answer follows.

The previous invention requires many sine waves (or many clicks) to be included in each time record so that the sine wave frequency (or click repetition frequency and its harmonics) will appear as discrete components in the frequency domain, thereby enabling them to be differentiated above low level spectral components resulting from random sources during shutdown, and from other possibly high level discrete components arising from the use of drills, pumps, and other equipment normally in use during shutdown. In the previous patent application, a 50 Hz sine wave, or better yet, ten clicks per second yielding discrete components at 10 Hz, 20 Hz, 30 Hz, 40 Hz, and 50 Hz, is indicated as optimum. A repetition rate lower than that might not result in sufficient clicks per record, indicated as optimally one second long.

In contrast to the previous invention's identically sized little clicks, which are evenly spaced throughout the record (a necessity for the generation of discrete spectral components), the present invention compresses nearly all the impact energy into a single pressure pulse at the beginning of the record, with the result that in the open (production) mode, the amplitude of the pressure pulse arriving upstream or downstream as a result of a seal leak (even an acceptable seal leak), will be within an order of magnitude of the surrounding masking noise resulting from flow in the pipe. This is a key target level in the present invention, for it allows 10,000 synchronous time averages to uncover the pressure pulse signal by lowering the masking noise from ten times greater, to ten times less. It can be almost always be achieved (possibly at the expense of a slightly reduced number of impacts per minute) by increasing the initial gap setting between the ram 60 and the anvil 58 (See FIG. 4b), or by increasing the size of the wind-catcher dish 70.

By contrast, in the previous invention, the repetitive clicks (which after all are still clicks, not a thump) are likely to be at least an order of magnitude smaller than the pressure pulse of the present invention (due to their more spread-out nature, and due to the practical constraints of having small size, low cost, highly repeatable, highly regular, intrinsically safe, click generator), and thus these clicks will likely be buried at least two orders of magnitude (not one order of magnitude) below the masking flow noise in the open (production) situation; and the discrete spectral components in the frequency domain will likewise be buried. It's a fact that synchronous averaging in the frequency domain reduces the non-synchronized spectral content at the same rate synchronous time averaging does in the time domain: by the square root of the number of averages. So in the given example, it would take another factor of 100 synchronous averages, or a grand total of 1,000,000 synchronous averages just to significantly uncover the signal, something the present invention does with only 10,000 synchronous time averages. With 990,000 more synchronous averages required, the previous invention could take months, instead of less than a day, to assess a valve's seal leak condition. That's why the previous patent application stated that synchronous averaging would not be a practical way to extend the use of the previous invention to the open (production) mode.

But even without background noise, the previous invention is inherently less effective. This is true for the closed (shutdown) mode too, where there's no flow noise, and the background noise may negligible. Here's why. As indicated above, many clicks (at least ten, as stated in the previous patent application) have to go into each time record to be subsequently analyzed in the frequency domain. This leads to a problem alluded to earlier, about reflections and natural frequencies. To better understand the problem, it will be useful to first digress, and look at similar situation, that of an pulse traveling down a steel rod of fixed length.

If the steel rod is fixed at one end, and impacted the other end with a hammer, the compression pulse will travel from the free end of the rod toward the fixed end at the speed of sound in steel, about 5,000 meters per second. Assuming the bar is 50 meters long, it will take 10 milliseconds to reach the other end, where because it is fixed, it will reflect as a compression pulse moving back the other way at 5,000 meters per second. When it again reaches the initial free end, however, it will reflect back in the original direction, but this time as a rarefaction pulse. As time goes on, and repeated reflections occur, the motion of the rod transforms to a complex superposition of standing waves at its various natural frequencies, which not surprisingly are related to the travel time of the pulse from one end of the rod to the other. In the case of the 50 meter steel rod, these frequencies are 25 Hz, 75 Hz, 125 Hz, 175 Hz, etc. The magnitudes of the associated standing waves are different at different positions along the rod.

Though not totally analogous, the situation just described is not too dissimilar from the situation of repetitive clicks (or a pulse) moving through the fluid of the pipe. The natural frequencies of course are different—on the one hand, lowered because of the lower speed of sound for liquids and gases; but on the other hand, raised because of the shorter travel lengths.

All that aside, as with the rod, only the first repetitive click (or the pulse on its initial run) may be unaltered by reflected pulses, and unaffected by natural modes and natural frequencies. But even that's not the case when the first repetitive click (or pulse on its initial run) follows too closely behind the prior click (or the prior pulse) so that its reflections and resulting oscillations have not yet died out. For the previous invention, the stated optimum click repetition period of 100 milliseconds (10 Hz rate) is far to short for the prior oscillations to die out. Even with the present invention, the time between adjacent pulses might be too short for the prior oscillations to die out. But it isn't a problem with the present invention, as long as the pulses generated by the pulse generator are randomly spaced, as of course they would be for the wind driven pulse generator. With random spacing, the reflections and oscillations from the previous pulse (because it's random with respect to the current trigger) are synchronous time averaged away, leaving just the reflections and oscillations from the current initially-arriving pulse, which of course do not interfere with that pulse (see FIGS. 5d, 5e, and 6a).

If a pulse generator is used in the present invention that generates pulses at a repetitive rate (not random), the reflections and oscillations from the previous pulse could interfere with the initially-arriving pulse, even with synchronous time averaging. This is not to preclude the possibility of using a repetitive pulse generating device, but the pulses that repetitive device generates would have to be spaced far enough apart to allow reflections and oscillations from the previous pulse to completely die out. A minimum of five seconds would probably be required.

With the previous invention, which contains several repetitive clicks in each record, and therefore reflections from those clicks as well as from clicks before the current record; the click rate harmonics in the frequency domain could wind up amplified or attenuated in a manner unrelated to the seal leakage rate, and (due to standing waves) may even depend on where along the pipe the transducer is located. The end result is that, with the prior invention, even for the straightforward closed (shutdown) case, seal leakage quantification will be difficult without many prior tests for each individual valve and installation configuration, and comparisons of results between valves where pipe runs and bends might be different (which in turn affect the reflections and natural frequencies) will be nearly impossible.

Fortunately, as indicated above, this is not the case with the present invention, where restricting the analysis to the initially-arriving pulse means reflections, natural frequencies, and natural modes have no effect. With the present invention, therefore, one needn't be concerned about internal cavity geometries, pipe lengths and transducer locations along those lengths, pipe bends, or other upstream and downstream obstructions (beyond the pressure transducers). As indicated previously, the present invention may at best be able to quantify leaks based on a simple calculation, or at worst, require just a small amount of field testing.

All this, without even taking into account the present invention's even sensitivity over a wide range of leak sizes. This attribute not only allows valves with bleed holes to be tested in the open (production) situation, it helps avoid "crying wolf" at acceptably low leak levels—something the previous invention might often do because of the coherence function's skewed sensitivity toward low leak magnitudes. The situation would be improved with the FRF function alternative in the previous invention, but the reflection and natural frequencies problem would still exist.

It should be noted, the previous invention is subject to reflections, and natural mode and natural frequency concerns in the open (production) mode too, where flow noise is used as the sound source. To reduce the transducer location aspect of the problem caused by standing waves, the previous patent application calls for using only frequencies for which the cavity sensor is separated from the upstream or downstream sensor by no more than ¼ wavelength. But this doesn't alleviate all the amplifications and attenuations as a function of frequency. And even at low frequencies, well within the ¼ wavelength frequency range, localized turbulence near one sensor (caused by a nearby flow obstruction or simply high flow with a resulting high Reynolds number) may result in low coherence even when large seal leaks should have yielded high coherence. Possibly, an extremely large number of averages (ensemble averages, not synchronous averages) could alleviate the situation, but the problem is this: if the user does not resort to using an extremely large number of averages whenever low coherence exists, how would he know that localized turbulence was the problem rather than coming to the more obvious, but erroneous, conclusion of no seal leak.

This predicament does not exist with the present invention. Here, the always high level of synchronous time averaging (10,000 averages) sufficiently reduces all masking noises (localized turbulence included) to a level that allows the initially arriving pressure pulse, passing through even moderately small seal leakage, to be seen in the time domain, and properly evaluated.

All the foregoing discussion should make clear the fact that, even though the previous invention may appear similar to the present invention, especially with the external sound source embodiment, the two inventions are indeed very different in methodology, in function, and in capability.

Two other inventions will now be mentioned, and shown why they too are different from the present invention, and less effective. They are both disclosed (but not yet examined) Japanese patents: Patent Disclosure Bulletin 62-0535; and Patent Disclosure Bulletin 1-187430, respectively.

The first of the disclosed Japanese patents describes a simplistic, comparative acoustic level approach for removing ambient levels to better determine if a valve is leaking. First, non-insertion acoustic levels (a descriptive term for acoustic levels obtained outside the pipe) are measured upstream and downstream of the valve, and the results are interpolated to arrive at an expected non-insertion acoustic level at the valve. Next, the actual non-insertion acoustic level is measured at the valve, and compared with the expected non-insertion acoustic level. If the two differ by a significant amount (3 to 6 dB is suggested as a minimum), a valve leak is presumed. Further, it is suggested the levels be compared in the frequency band, 10 KHz to 100 KHz. It should be obvious without further discussion, that this invention is very different from the present invention, and rudimentary by comparison.

Figure 9:
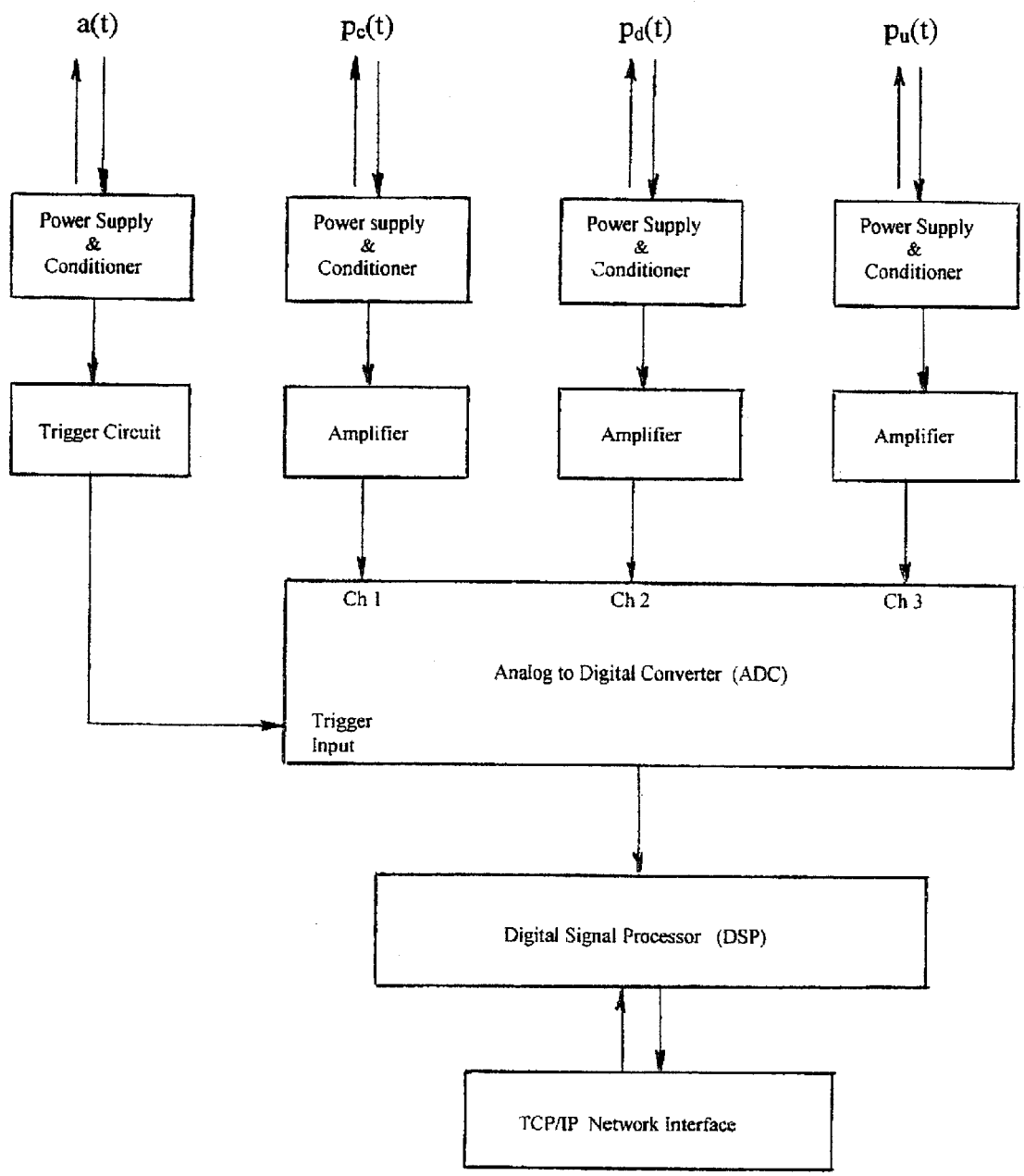
FIG. 9 is a functional block diagram of a preferred embodiment of the signal gathering and signal manipulating portions of an installed system utilizing the present invention, including all the transducers.

The second of the referenced disclosed Japanese patents is seen to be remarkably similar to the first, in terms of its concept. Here, the background noise is measured upstream and downstream of the valve, averaged, and then subtracted from the noise measured at the valve to yield the leak signal. The object, as above, is to eliminate the background noise, leaving only the leak signal. And as before, the big assumption is, any noise at the valve and not upstream and downstream can only be due to a leak. Again, it should be obvious that this is very different than the present invention. Getting back now to the present invention, FIG. 9 illustrates a functional block diagram of the electronics portion of the system, for gathering and manipulating the various signals. Four small power supplies provide low level power for the four transducers (the three pressure transducers and the accelerometer). The output of the accelerometer goes to the trigger circuit, whose output goes to the trigger input of the ADC.

The conditioned pressure transducer outputs go to three input channels of the ADC for sampling, but first, the question of additional amplification prior to sampling needs to be addressed. ADC Model LTC1605 samples each pressure transducer output with a resolution of 16 bits (one part in approximately 65,000), which for a ±2.5 volt full range, translates to a resolution of approximately 0.077 millivolts. At 20 millivolts per psi (assuming no additional amplification), that's a pressure resolution of about 0.004 psi. For better pressure resolution, additional amplification prior to sampling can be employed, but effective resolution also improves directly with the number of synchronous time averages, as long as the DSP can handle the extra digits (which it can with its 32 bit architecture), and as long as the background noise exceeds a level equal to at least half the original resolution (very likely with flow noise in the production mode, even with very low pressure gas). But that noise requirement poses a problem too, for although the effective resolution improves to an amazing 0.0000004 psi, the remaining noise level after averaging can only improve to 0.00002 psi. With oil, this is still sufficient to require no additional amplification, but with gas (regardless of flow or pressure), an additional gain of at least 100 is desirable, and so an amplifier stage is included before the ADC.

The sampled outputs of the three ADC channels are routed to the DSP for synchronous time averaging; initially-arriving pressure peak identification and valuation; normalization of upstream and downstream initially arriving pressure peaks; quantifying, dating, and archiving; trending, including analysis of ball valves with bleed holes in the open (production) mode; and network access (TCP/IP) for all results. It is expected that system operators, either on the platform or on shore, will access all the results via the network.

Although the wind driven random pulse generator, the accelerometer, the pressure transducers, the ADC, the DSP, and more, have all been described or specified in detail in the present application, it is important to realize that alternate arrangements still within the scope of the present invention, would have been feasible. It will be appreciated by those skilled in the art that changes or modifications could be made to the above described embodiment without departing from the broad inventive concepts of the invention. It should be appreciated, therefore, that the present invention is not limited to the particular embodiment disclosed but is intended to cover all embodiments within the scope or spirit of the described invention.

What is claimed is:

1. An apparatus for use with a fluid transport system, the system having an upstream pipe, a downstream pipe and a valve connected between the upstream pipe and the downstream pipe for controlling fluid flow through the system, the valve having at east one upstream seal, at least one downstream seal and an inner cavity effectively isolated by the seats from the fluid flow stream the apparatus for detecting the presence of a leak in at least one of the seals and for determining the magnitude of a detected leak, tile apparatus comprising:

a mechanism for generating random pressure pulses which appear in the inner cavity;

a first sensor for detecting the onset of each pressure pulse which exceeds a predetermined magnitude and for generating a trigger signal for each such detected pressure pulse;

a second sensor in fluid communication with the inner cavity for sensing pressure pulses within the inner cavity and for generating a representative second signal as a function of time for each such sensed pressure pulse;

a third sensor in fluid communication with the fluid flow stream, the third sensor being located at one of (1) a predetermined distance upstream of the upstream seal and (2) a predetermined distance downstream of the downstream seal, the third sensor for sensing pressure pulses and for generating a representative third signal as a function of time for each such sensed pressure pulse;

analysis circuitry for receiving the trigger signals and the second and third sigeals, for sampling the second and third signals at predetermined times following the receipt of a trigger signal, for synchronously averaging each of the sampled signals over multiple records to produce synchronously averaged waveforms, and for using the two resulting synchronous averaged waveforms to determine the existence and the magnitude of a seal leak in at least one of the seals.

2. The apparatus as recited in claim 1 wherein the generated pressure pulses are randomly spaced in time.

3. The apparatus as recited in claim 1 wherein the generated pressure pulses are spaced far enough apart in time such that reflections from a first generated pulse have sufficiently diminished before the initiation of the next generated pulse so that any such remaining reflections are essentially undetected.

4. The apparatus as recited in claim 1 wherein the generated pressure pulses vary in magnitude.

5. The apparatus as recited in claim 1 wherein the mechanism is wind driven.

6. The apparatus as recited in claim 1 wherein the second and third signals are sampled for predetermined durations which are established based upon a estimate of the duration of the generated pressure pulses.

7. The apparatus as recited in claim 1 wherein the predetermined times for which the second and third signals are sampled following a trigger signal are established based upon an estimated time of arrival of the generated pulses at the location of the second and third sensors, respectively.

8. The apparatus as recited in claim 1 wherein the analysis circuitry divides the synchronously averaged waveform of the third signal by the synchronously averaged peak pressure value of the second signal for normalization.

9. The apparatus as recited in claim 1 wherein the mechanism comprises:

a housing including an enclosed inner chamber which is in fluid communication with the inner cavity of the valve;

a diaphragm edge mounted within the inner chamber;

an anvil located outside of the housing, the anvil being mechanically coupled to the diaphragm so that movement of the anvil causes the diaphragm to move; and a ram moveably supported proximate to the anvil, the ram including a wind catcher, whereby wind action causes the ram to move and strike the anvil which in turn causes the diaphragm to move to create a pressure pulse within the chamber, the pressure pulse being transmitted by the fluid to the inner cavity of the valve.

10. The apparatus as recited in claim 9 wherein the diaphragm is comprised of a thin, generally circular plate of high strength material having a plurality of openings extending therethrough.

11. The apparatus as recited in claim 9 wherein the anvil is mechanically coupled to the axial center of the diaphragm.

12. The apparatus as recited in claim 9 wherein the wind catcher comprises a dish having a predetermined diameter.

13. An apparatus for use with a fluid transport system, the system having an upstream pipe, a downstream pipe and a valve connected between the upstream pipe and the downstream pipe for controlling fluid flow through the system, the valve at least one upstream seal, at least one downstream seal and an inner cavity effectively isolated by the seals from the fluid flow stream, the apparatus for detecting the presence of a leak in at least one of the seals and for determining the magnitude of a detected leak, the apparatus comprising:

a mechanism for generating random pressure pulse which appears in the inner cavity;

a first sensor for detecting the onset of each pressure pulse which exceeds a predetermined magnitude and for generating a trigger signal for each such detected pressure pulse;

a second sensor in fluid communication with the inner cavity for sensing pressure pulses within the inner cavity and for generating a representative second signal as a function of time for each such sensed pressure pulse;

a third sensor in fluid communication with the fluid flow stream, the third sensor being located at a predetermined distance upstream of the upstream seal for sensing pressure pulses and for generating a representative third signal as a function of time for each such sensed pressure pulse;

a fourth sensor in fluid communication with the fluid flow stream, the fourth sensor being located at a predetermined distance downstream of the downstream seal for sensing pressure pulses and for generating a representative fourth signal as a function of time for each such sensed pressure pulse;

analysis circuitry for receiving the trigger signals and the second, third and fourth signals, for sampling the second, third and fourth signals at predetermined times following the receipt of a trigger signal, for synchronously averaging each of the sampled signals over multiple records to produce synchronously averaged waveforms and for using the synchronously averaged waveforms to determine the existence and the magnitude of a seal leak in either of the seals.

14. The apparatus as recited in claim 13 wherein the generated pressure pulses are randomly spaced in time.

15. The apparatus as recited in claim 13 wherein the generated pressure pulses are spaced far enough apart in time such that reflections from a first generated pulse have sufficiently diminished before the initiation of the next generated pulse so that any such remaining reflections are essentially undetected.

16. The apparatus as recited in claim 13 wherein the generated pressure pulses vary in magnitude.

17. The apparatus as recited in claim 13 wherein the mechanism is wind driven.

18. A method for determining the presence and the magnitude of a leak within a fluid transport system, the fluid transport system having an upstream pipe, a downstream pipe and a valve connected between the upstream pipe and the downstream pipe for controlling fluid flow through the system, the valve having at least one upstream seal, at least one downstream seal and at least an inner cavity effectively isolated by the seals from the fluid flow stream, the method comprising:

generating random pressure pulses which appears in the inner cavity;

generating a trigger signal at the onset of each pressure pulse which exceeds a predetermined magnitude;

sensing each pressure pulse within the inner cavity and generating a representative second signal as function of time for each such sensed pressure pulse;

sensing each pressure pulse within the fluid flow stream at a predetermined distance from the valve and generating a representative third signal as a function of time for each such sensed pressure pulse;

sampling the second and third signals at predetermined times following a trigger signal; and synchronously averaging each of the sampled signals over multiple records and using the resulting synchronous averaged waveforms to determine the existence and magnitude of a seal leak in at least one of the seals.

19. The method as recited in claim 18 wherein the generated pressure pulses are randomly spaced in time.

20. The method as recited in claim 18 wherein the predetermined times following the trigger signal are established based upon an estimated time of arrival of the pressure pulses at the predetermined distance from the valve.

* * * * *